(12) United States Patent  
Nebeker et al.

(10) Patent No.: US 8,658,114 B2  
(45) Date of Patent: Feb. 25, 2014

(54) METHODS FOR RECOVERING COBALT FROM COPPER SOLVENT EXTRACTION RAFFINATE

(75) Inventors: Neil Nebeker, Hayden, AZ (US); Matthew L. Rodgers, Midland, MI (US); Charles R. Marston, Midland, MI (US)

(73) Assignee: Asarco LLC, Tucson, AZ (US)

( * ) Notice: Subject to any disclaimer, the term of this patent is extended or adjusted under 35 U.S.C. 154(b) by 56 days.

(21) Appl. No.: 13/024,766

(22) Filed: Feb. 10, 2011

(65) Prior Publication Data

US 2011/0194999 A1     Aug. 11, 2011

Related U.S. Application Data

(60) Provisional application No. 61/303,022, filed on Feb. 10, 2010.

(51) Int. Cl.
  *C01G 3/00*     (2006.01)

(52) U.S. Cl.
  USPC ............................................ 423/24; 423/139

(58) Field of Classification Search
  USPC .......................... 423/24, 139; 210/660–670; 205/580–584, 589–596
  See application file for complete search history.

(56) References Cited

U.S. PATENT DOCUMENTS

| | | |
|---|---|---|
| 3,998,924 A | 12/1976 | Jones et al. |
| 4,039,612 A | 8/1977 | Price et al. |
| 4,254,087 A | 3/1981 | Grinstead |
| 5,571,308 A | 11/1996 | Duyvesteyn et al. |
| 6,350,420 B1 | 2/2002 | Duyvesteyn et al. |
| 7,594,951 B2 | 9/2009 | Rossiter |
| 2007/0297960 A1 | 12/2007 | Krebs |

OTHER PUBLICATIONS

Bailey, C., "Removal of Nickel from Cobalt Sulphate Electrolyte Using ISEP Continuous Ion Exchange," Anglovaal Mining Limited and Hatch Africa, Private Bag X20, Gallo Manor, 2052 South Africa, 16 pages.

Grinstead, Robert R., "Selective Absorption of Copper, Nickel, Cobalt and Other Transition Metal Ions from Sulfuric Acid Solutions with the Chelating Ion Exchange Resin XFS 4195," Dow Chemical U.S.A., Walnut Creek, California, (Received Oct. 25, 1983; accepted in revised form Mar. 12, 1984),reprinted from Hydrometallurgy 12 (1984) 387-400, Elsevier Science Publishers B.V., Amsterdam, Netherlands (1984), pp. 387-400.

Moskalyk, R.R. et al., "Review of Present Cobalt Recovery Practice," Minerals & Metallurgical Processing, vol. 17, No. 4, (Nov. 2000), pp. 205-216.

Mendes, F. D., et al., "Selective sorption of nickel and cobalt from sulphate solutions using chelating resins," Centro De Desenvolvimento Mineral, Companhia Vale do RioDoce, CVRD, Rodovia BR 262, Santa Lucia 33010-970, Brazil, Dept. of Materials and Metallurgical Engineering, UFMG, Brazil (Received Jan. 19, 2004; received in revised form Mar. 26, 2004; accepted Apr. 9, 2004), Int. J. Miner. Process, 74 (2004), pp. 359-371, Elsevier B.V. (2004) doi:10.1016/j.minpro.2004.04.003.

Pavlides, A.G., Bateman Engineering, Sydney, Australia and Wyethe, J., Council for Mineral Technology, Randburg, South Africa, "Ion Exchange Column Design for Separation of Nickel Traces from Cobalt Electrolyte," Preston Resources by Mintek for Bulong Nickel Project, 20 pages.

International Search Report and Written Opinion for PCT/US11/24366, dated Apr. 20, 2011, 7 pages.

*Primary Examiner* — Steven Bos

(74) *Attorney, Agent, or Firm* — Fennemore Craig, P.C.

(57) ABSTRACT

A method for extracting cobalt from copper raffinate. First, a supply of raffinate containing at least cobalt, copper, ferric iron and nickel, is provided. The raffinate is pretreated by one or all of raising the raffinate pH level; removing solids; and, reducing ferric iron to ferrous iron. Substantially all copper is removed using first ion exchange resin selective for copper. A second ion exchange resin selective for both cobalt and nickel is used to remove the cobalt and nickel. Cobalt and nickel are separately eluted from the second ion exchange resin.

37 Claims, 20 Drawing Sheets

METHODS FOR RECOVERING COBALT FROM COPPER SOLVENT EXTRACTION RAFFINATE

CROSS-REFERENCE TO RELATED APPLICATIONS

This application claims priority to provisional U.S. Patent Application Ser. No. 61/303,022, filed Feb. 10, 2010, which is incorporated by reference as though fully set forth herein.

FIELD OF THE INVENTION

This invention relates to methods for extracting metals from raw ore generally and more specifically to processes for recovering cobalt from copper solvent extraction raffinate with ion exchange technology.

BACKGROUND OF THE INVENTION

In mining operations, raw ore contains metals of value that are recoverable. Several known techniques, including solvent extraction ("SX") are used to chemically separate metals from raw ore. In SX, metal ions, for example, copper ions, are leached or otherwise extracted from raw copper ore using chemical agents, such as strong acid. The copper is then plated out of solution onto stainless steel sheets using electrowinning ("EW") processes. Cobalt, a naturally occurring valuable metal, is added to many copper EW tankhouses to reduce not only corrosion of insoluble lead anodes but also the overvoltage of the oxygen evolution from the anodes. The byproduct of SX is raffinate in which certain metals, including cobalt, may remain after the metal of primary interest, e.g., copper, is extracted from the pregnant leach solution ("PLS").

BRIEF SUMMARY OF THE INVENTION

The following summary is provided as a brief overview of the claimed method and apparatus. It should not limit the invention in any respect, with a detailed and fully-enabling disclosure being set forth in the Detailed Description of the Invention section. Likewise, the invention shall not be restricted to any numerical parameters, processing equipment, chemical reagents, operational conditions, and other variables unless otherwise stated herein.

A method for extracting cobalt from raffinate according to the present invention comprises: providing a supply of raffinate comprising at least cobalt, copper, ferric iron and nickel; pretreating the raffinate in a manner that will allow substantially all copper to be removed from the raffinate; removing substantially all copper from the raffinate with a first ion exchange resin selective for copper, the first ion exchange resin binding to the copper; absorbing each of cobalt and nickel from the raffinate using a second ion exchange resin selective for both cobalt and nickel, the second ion exchange resin binding to both cobalt and nickel; eluting cobalt from the second ion exchange resin; and eluting nickel from the second ion exchange resin.

In another embodiment, a method for recovering cobalt from raffinate, may comprise: providing a supply of raffinate, the raffinate comprising at least copper, ferric or ferrous iron, nickel and zinc; raising a pH level of the raffinate to between about 3 and about 3.5; removing substantially all copper from the raffinate by using an oxime reagent to bind the copper; if the raffinate contains ferric iron, reducing the ferric iron to ferrous iron; removing cobalt, zinc and nickel from the raffinate using an ion exchange resin selective for cobalt, zinc and nickel, the ion exchange resin attaching to the cobalt, zinc and nickel; separating the nickel from the ion exchange resin using a first aqueous solution of a first strong acid; and separating the cobalt and zinc from the ion exchange resin using a second aqueous solution of a second strong acid, the second aqueous solution being stronger than the first aqueous solution, the cobalt and zinc being removed together in the second aqueous solution.

BRIEF DESCRIPTION OF THE DRAWINGS

The accompanying figures, which are incorporated herein and form a part of the specification, illustrate various embodiments of the present invention and, together with the description, serve to explain the invention. In the figures.

DETAILED DESCRIPTION OF THE INVENTION

Figure 1:
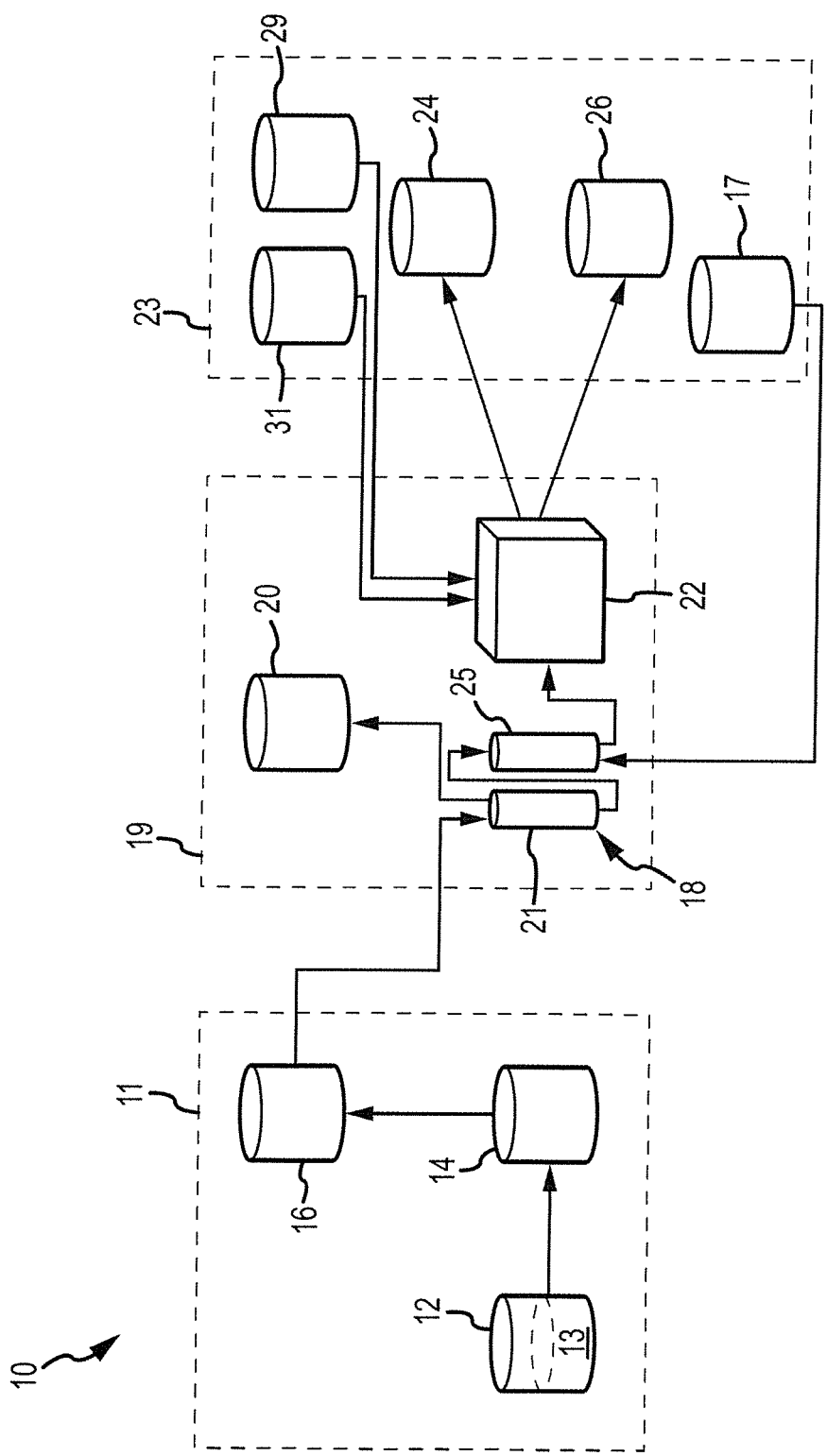
FIGS. 1-1A are flow sheets illustrating apparatus of the present invention for recovering cobalt and nickel from raffinate.

Although SX performs well in extracting copper from PLS, it is not an efficient or economical method for recovering cobalt from mine leach or raffinate 13 streams. Cobalt concentration in raffinate 13 is so dilute that the SX method cannot be used for extraction. Also, aluminum interferes with SX by generating a large amount of crud in the extraction stages.

The present invention provides a means for recovering cobalt and other metals using a combination of SX and ion exchange methods, which may yield significant operational metal. By recovering cobalt and other metals, these metals may be recycled into the SX process. Therefore, it may be desirable to remove cobalt and other metals from raffinate 13 using the apparatus 10 and method 100 of the present invention.

The present invention comprises apparatus 10 and method 100 for extracting cobalt from raffinate 13 using ion exchange, SX and elution processes as are described more fully below. Apparatus 10 and method 100 of the present invention may be a function of the various constituents of raffinate 13, which may depend not only on the constituents of the metal ore, but also on the reagents used during SX. In one embodiment, raffinate 13 comprises at least copper, cobalt, nickel, iron (ferrous and ferric). In other embodiments, raffinate 13 may also comprise any or all of ferrous iron, magnesium or zinc.

Various embodiments of apparatus 10 will now be described with reference to the drawing figures. In an embodiment shown in FIG. 1 in which the raffinate 13 comprises at least copper, cobalt, nickel, magnesium and iron, apparatus 10 comprises pretreatment system 11, ion exchange system 19, and eluate system 23.

Pretreatment system 11 allows raffinate 13 to be pretreated by adjusting the pH level and reducing iron, to prepare raffinate 13 for the ion exchange processes. As shown in FIG. 1, pretreatment system 11 comprises raffinate tank 12, process tank 14 and drum filter 16. In another embodiment, in which raffinate 13 comprises organic, pretreatment 11 may also include vessel(s) (not shown) for organic removal using adsorbent resins or chelating resins or a combination as may be appropriate given the total organic carbon composition of raffinate 13.

Raffinate tank 12 is sized to receive raffinate 13 generated through copper SX. Raffinate tank 12 is fluidically connected to process tank 14. As used herein, "fluidically connected" means connected using pipes, conduits, valves, pumps and other similar apparatus that provide for the movement of fluid in systems of this type. Once raffinate 13 leaves raffinate tank 12, raffinate 13 enters process tank 14, which is sized to receive, not only raffinate 13, but also other reagents to aid in the processes to be performed in process tank 14. As mentioned above, in process tank 14, the pH of raffinate 13 may be adjusted and iron may be reduced. In the embodiment shown in FIG. 1, in process tank 14, the pH of raffinate 13 may be raised from between about 1.45 to about 1.8 to about 3.0 to about 3.5, preferably about 3.0 to about 3.2, in process tank 14, by adding calcium oxide (CaO), calcium carbonate ($CaCO_3$) or other similar reagents contained in a vessel (not shown) connected to process tank 14. Depending on the composition of raffinate 13 involved, in other embodiments, pH may be adjusted up or down to obtain the desired pH, as would be familiar to one of ordinary skill in the art after becoming familiar with the teachings of this invention; in other embodiments, the pH may not need to be adjusted at all. In the embodiments disclosed herein, the desired pH is in the range of about 3.0 to about 3.5, preferably between about 3.0 and about 3.2; based on the ion exchange resins or SX processes used, a different pH may be preferred.

In the embodiment shown in FIG. 1, raising the pH by adding addition of CaO produces solids requiring removal to minimize clogging of ion exchange system 19. These solids may be removed using a variety of commercially available coagulants and flocculents, such as Nalco N8850 coagulant and N7871 flocculent, which may be added to process tank 14 following pH adjustment. The coagulant and flocculent are commercially available from Nalco Company, Tempe Ariz. The coagulants and flocculents may be contained in a vessel (not shown) connected to process tank 14. The coagulated solids may then be removed by filtering, such as by running raffinate 13 through drum filter 16 which is fluidically connected to process tank 14 to receive the solids removed from process tank 14. Other known mechanical separation processes may be used to separate the coagulated solids from raffinate 13. In another embodiment, an additional filter (e.g., inline cartridge filter (not shown)) may be added to apparatus 10 immediately upstream of copper removal ion exchange unit 18.

In addition to pH level adjustment, iron reduction may also take place in the process tank 14, as in the embodiment illustrated in FIG. 1. As explained more fully below, iron reduction may be beneficial given the affinities for ferric iron or ferrous iron of the various ion exchange resins selected for the process. See FIG. 8. In the embodiment shown in FIG. 1, iron reduction from ferric iron to ferrous iron is achieved by addition of sodium sulfite ($Na_2SO_3$) or other similar reagents, which may be contained in a vessel (not shown) connected to process tank 14. Alternatively, an intermediate tank for iron reduction or other processes may be provided before raffinate 13 enters ion exchange system 19. Of course, if the raffinate 13 contains only ferrous iron, no reduction is necessary.

Once raffinate 13 has been pretreated 105 according to embodiments of the present invention, pretreated raffinate 13 enters ion exchange system 19 which is fluidically connected to process tank 14. In the embodiment shown in FIG. 1, ion exchange system 19 comprises copper removal ion exchange unit 18 and cobalt/nickel removal ion exchange unit 22, both of which comprise multiple resin columns which may be arranged in fixed beds of lead-lag configuration or in carousel or other configurations as would be familiar to one of ordinary skill in the art after becoming familiar with the teachings of the present invention. In another embodiment, ion exchange system 19 may comprise cobalt/nickel/zinc removal ion exchange unit 15. See FIGS. 2-4. In embodiments described herein, copper removal precedes cobalt/nickel removal from raffinate 13 because the bispicolylamine functionalized ion exchange resin that has a high affinity for cobalt and nickel also has a high affinity for copper. See FIG. 8. Copper can contaminate the bispicolylamine resin, a chelating resin, by loading the resin preferentially, requiring ammonia solutions (as opposed to strong acid solution) to strip out the copper. Therefore, as shown in FIG. 1, copper removal ion exchange unit 18 is upstream of cobalt/nickel ion exchange unit 22 in apparatus 10.

Copper removal ion exchange unit 18 may be a fixed bed system loaded with an ion exchange resin with a high affinity for copper, such as a hydroxypropylpicolylamine functionalized resin, a chelating resin with high affinity for copper at low pH (e.g., between about 3.0 to about 3.5) that can be stripped using strong acid solutions; it is commercially available as XUS-43605 from The Dow Chemical Company; however, other similar resins could also be used. The fixed bed system may comprise multiple beds in a lead-lag configuration, as shown in FIG. 1, comprising lead (first) column 21 and lag (second) column 25 (although the designation of lead and lag may change during processing depending on which column is primarily loaded with copper). In various embodiments, copper removal ion exchange unit 18 may comprise two, three, four or more beds. Process tank 14 is fluidically connected to the top of the lead column 21, so that raffinate 13 may be pumped into the top of lead column 21, exiting the bottom of lead column 21 and entering the top of lag column 25. Copper removal ion exchange unit 18 loaded with ion exchange resin selective for copper removes substantially all copper in raffinate 13. "Substantially all" means from about 95% to about 100% of the copper in raffinate 13. Preferably, all copper is removed, so that the raffinate 13 exiting the bottom of the lag column 25 is copper-free. As is explained in more detail below, copper may be stripped and the beds (e.g., lead column 21 and lag column 25) regenerated using copper eluent comprising sulfuric acid ($H_2SO4$) or a lean electrolyte (containing copper and strong acid, such as $H_2SO4$). In an embodiment comprising lead column 21 and lag column 25, regeneration may be accomplished countercurrent to the direction of loading with a 20% $H_2SO4$ solution. See FIG. 1. Copper eluent may be contained in copper eluent tank 17, which is part of eluent system 23 and is fluidically connected to copper removal ion exchange unit 18. The copper is recovered as copper sulfate ($CuSO_4$) in solution which is removed to copper recovery vessel. Copper recovery vessel 20 is fluidically connected to copper removal ion exchange unit 18. Copper recovery vessel 20 may comprise an intermediate tank or the actual copper EW tankhouse.

Raffinate 13 is then conveyed to cobalt/nickel removal ion exchange unit 22 which is fluidically connected to copper removal ion exchange unit 18. Cobalt/nickel removal ion exchange unit 22 may be a fixed bed system comprising multiple columns loaded with an ion exchange resin with a high affinity for both cobalt and nickel, such as bispicolylamine functionalized ion exchange resin which is commercially available as XUS-43578 from The Dow Chemical Company, although other similar resins may also be used.

After full loading of the columns with nickel and cobalt, nickel and cobalt are stripped by means of eluate system 23. In addition to copper eluent tank 17, eluate system 23 comprises cobalt eluent tank 24 and nickel eluent tank 26. Cobalt eluent tank 31 and nickel eluent tank 29 are fluidically connected to cobalt/nickel removal ion exchange unit 22 so that, at the appropriate point, either cobalt eluent or nickel eluent can be added to the cobalt/nickel removal ion exchange unit 22 to strip either cobalt or nickel from the loaded resin. Since cobalt does not adhere as strongly to the resin as nickel, cobalt may be considered easier to remove than nickel, using an acid concentration weaker than that required to strip the nickel. Therefore in the embodiment shown in FIGS. 1-4, cobalt is removed first. Cobalt eluent tank 31 is sized for holding cobalt eluent which comprises $H_2SO_4$ in concentration of about 2% to about 4%, preferably between 2.5% to 3.85%, although weak concentrations of other strong acids may also be used. As used herein "strong acid" means hydrochloric acid (HCl), nitric acid ($HNO_3$) and perchloric acid ($HClO_4$), as well as $H_2SO_4$. With the addition of cobalt eluent from cobalt eluent tank 31 to the cobalt/nickel removal ion exchange unit 22, cobalt is stripped from the resin and conveyed in solution to cobalt eluate tank 24.

Figure 2:
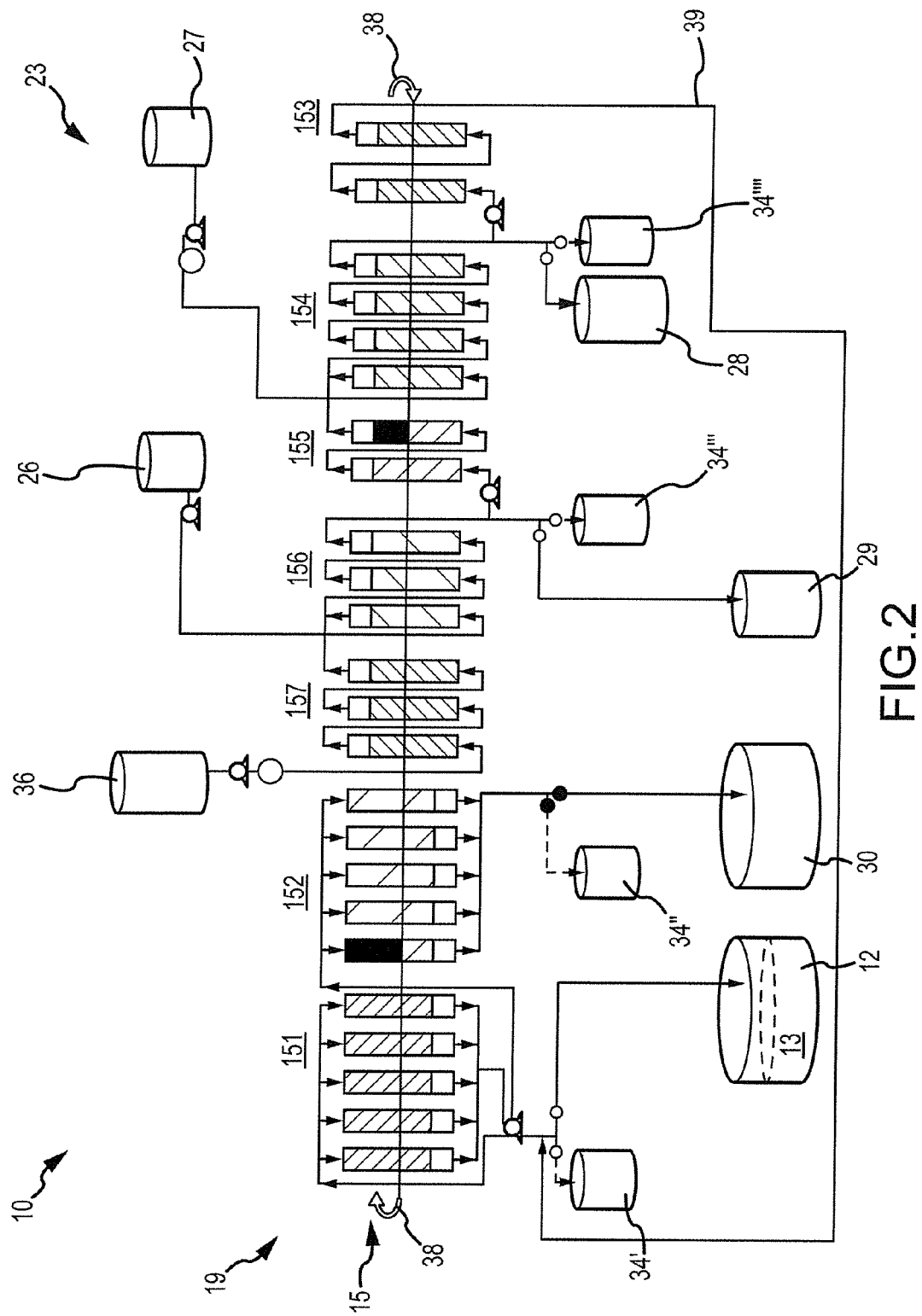
FIG. 2 is a flow sheet illustrating apparatus of the present invention for recovering cobalt, zinc and nickel from raffinate.
Figure 3:
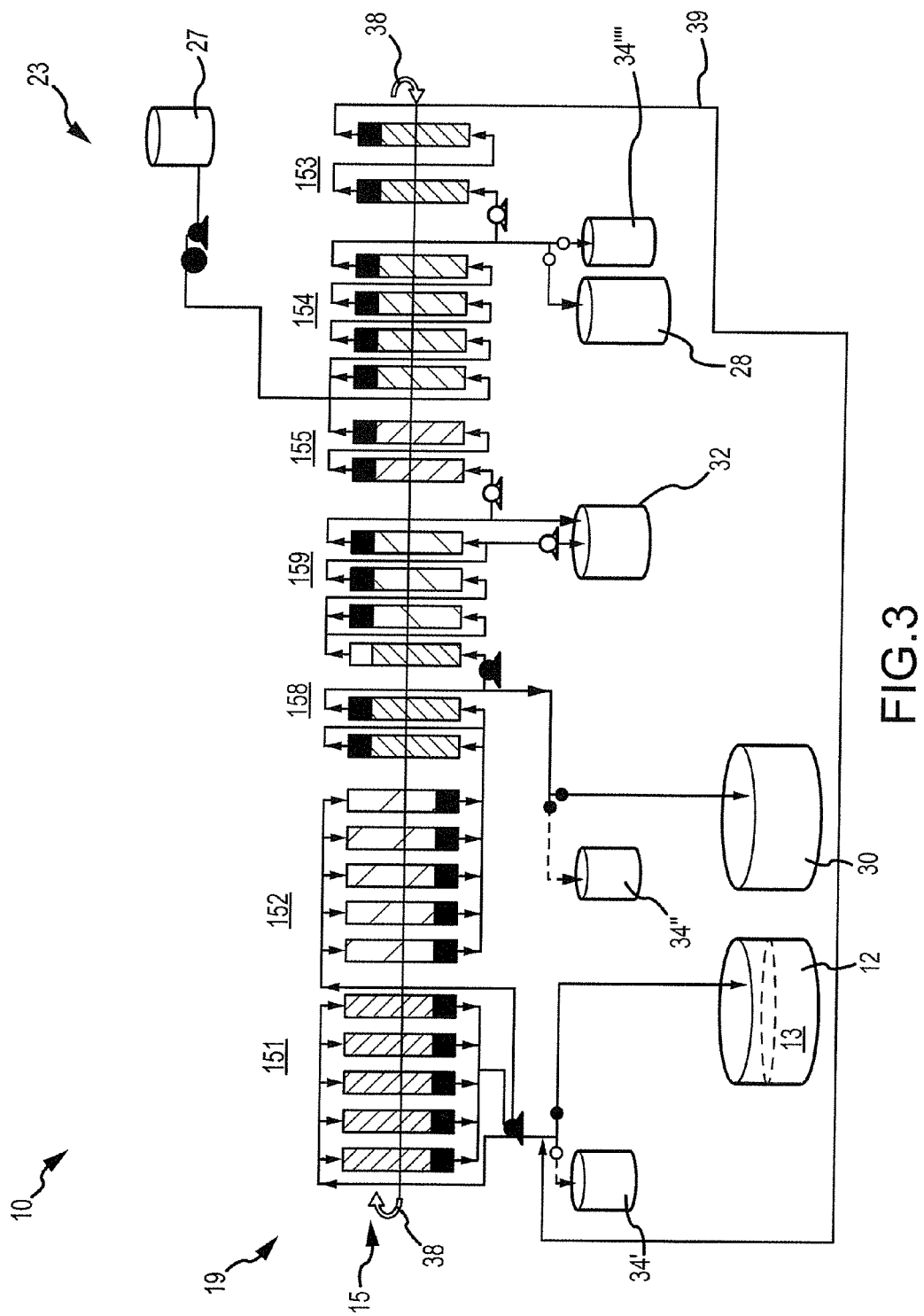
FIG. 3 is a flow sheet illustrating apparatus of the present invention for recovering cobalt, zinc and nickel from raffinate.

In an embodiment wherein raffinate 13 comprises zinc, eluate system 23 further comprises cobalt/zinc eluent tank 27, as shown in FIGS. 2 and 3. Cobalt/zinc eluent tank 27 is fluidically connected to cobalt/nickel removal ion exchange unit 22, which in the embodiment being described also removes zinc using the second ion exchange resin (e.g., bispicolylamine functionalized ion exchange resin). Cobalt/zinc eluent tank 27 is sized for holding cobalt/zinc eluent comprising $H_2SO_4$ in concentration of about 2% to about 4% by volume, preferably between 2.5% to 3.85% by volume, although weak concentrations of other strong acids could be used. Cobalt/zinc eluent may be the same substance as cobalt eluent described above. Cobalt and zinc are stripped out together using cobalt/zinc eluent and are conveyed in solution to cobalt/zinc eluate tank 28. From there, cobalt may be stripped using various methods as are described below.

Nickel is next removed. Nickel eluent tank 29 is sized for holding nickel eluent which comprises $H_2SO_4$ in concentration of about 20% by volume or 200 g/L, although other high concentrations of strong acid could also be used. With the addition of nickel eluent from nickel eluent tank 31 to the cobalt/nickel removal ion exchange unit 22, nickel is stripped from the resin and conveyed in solution to nickel eluate tank 26.

Depending on the metals to be recovered from raffinate 13, in another embodiment of the invention, eluate system 23 may also comprise additional eluent and eluate tanks fluidically connected to ion exchange system 19. Additional eluent tanks, such as cobalt/zinc eluent tank 27, may hold eluent for stripping desired metals from ion exchange resin. Additional eluate tanks, such as cobalt/zinc eluate tank 28, may be provided to recover such metals in solution. Similarly, depending on the particular embodiment of method 100 carried out, apparatus 10 may also comprise additional vessels, including rinse, barren, feed, eluent and eluate tanks, including barren tank 30, nickel eluent rinse water tank 36 and mass balance tank 34.

Other embodiments of apparatus 10 will now be described with reference to FIGS. 1A-4. In an embodiment shown in FIG. 1A, copper SX unit 118 may be used in apparatus 10 instead of copper removal ion exchange unit 18. After the pH has been raised in process tank 14 in the manner previously described, raffinate 13 is subjected to SX. Raising the pH is thought to disturb the equilibrium between copper and organic in raffinate 13, allowing copper to be pulled out by SX processes. A high percentage (e.g., about 10% by volume) of metal extraction reagent (e.g., an oxime or the equivalent) in aqueous solution is added to copper SX unit 118. In one embodiment, aldoxime was used as the metal extraction reagent, although ketoxime or another oxime could also be used. Aldoxime is commercially available from Cytec Corporation, Tempe, Ariz. as Acorga reagents, such as Acorga 5910. The metal extraction reagent attaches to the copper so that substantially all of the copper is removed from raffinate 13. Copper may be recovered from the metal extraction reagent in solution by stripping it with copper eluent, which in one embodiment comprises a strong acid (e.g., $H_2SO_4$) at a concentration of about 150 g/L to about 200 g/L or lean electrolyte (e.g., containing about 35 g/L copper). Copper eluent may be contained in copper eluent tank 17, which is part of eluent system 23 and is fluidically connected to copper SX unit 118. The copper is recovered as $CuSO_4$ in solution which is removed to copper recovery vessel 20. Copper recovery vessel 20 is fluidically connected to copper SX unit 18. Copper recovery vessel 20 may comprise an intermediate tank or the actual copper EW tankhouse. Additionally, as previously described, the pretreatment system 11 may comprise drum filter 16 or other mechanical separation apparatus may be used to remove coagulated solids resulting from coagulants and flocculents, as previously described.

Figure 4:
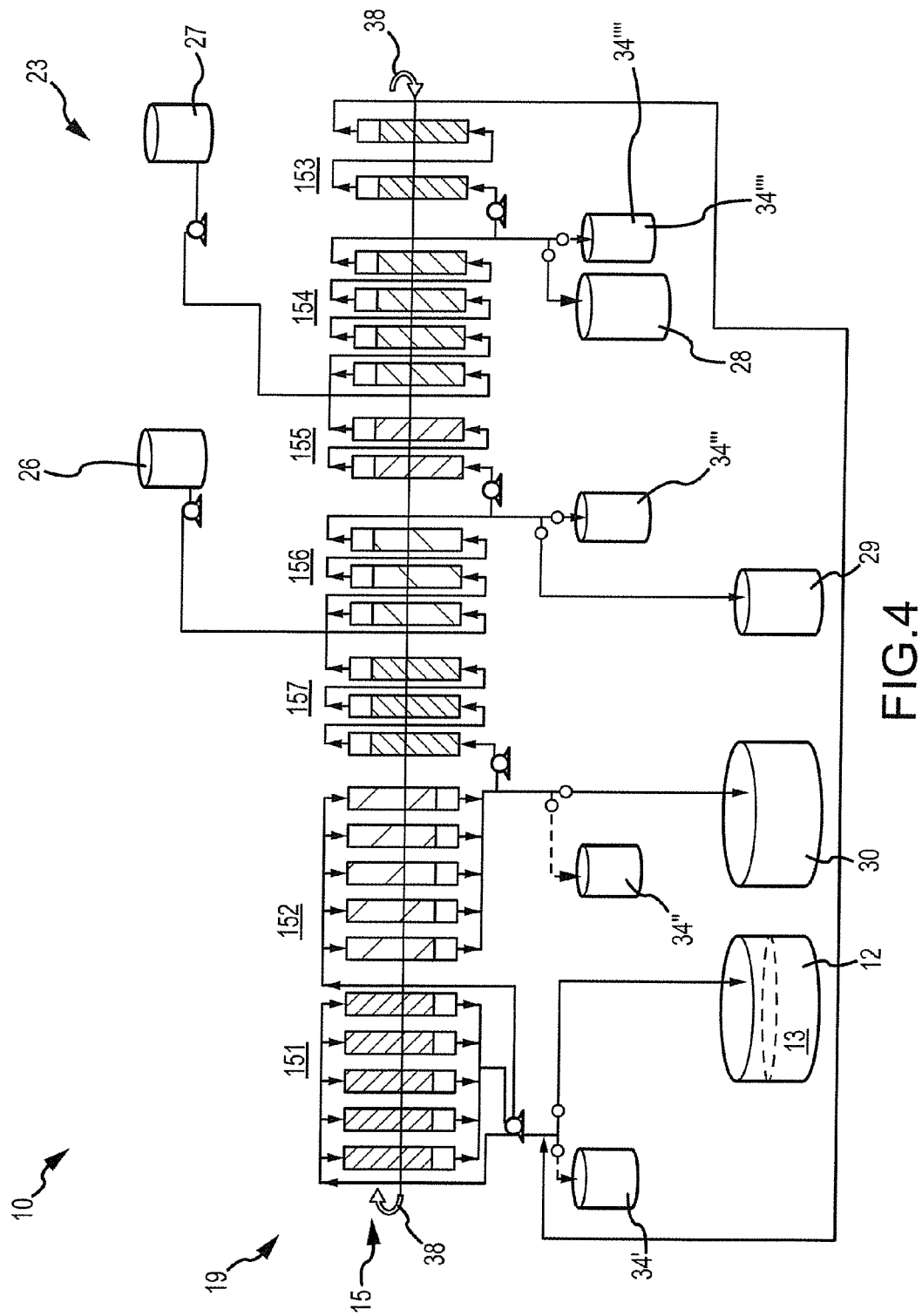
FIG. 4 is a flow sheet illustrating apparatus of the present invention for recovering cobalt, zinc and nickel from raffinate.

With reference to FIGS. 2 and 3, other embodiments of apparatus 10 will now be described. Although apparatus 10 comprises process tank 14, drum filter 16, copper ion exchange unit 18 or copper SX unit 118, copper eluent tank 17 and copper removal vessel 20, FIGS. 2 and 3 focus on ion exchange system 19 and eluate system 23. See also FIG. 4. In the embodiments shown, apparatus 10 comprises raffinate tank 12 which is sized for holding raffinate 13 (e.g., 400 gallons). Raffinate 13 in this embodiment comprises zinc or zinc and magnesium, as well as cobalt, nickel and ferrous iron, the copper having already been removed and the iron having already been reduced. As shown in FIGS. 2-4, mass balance tank 34' is fluidically connected to raffinate tank 12 so that raffinate 13 may be analyzed prior to the point at which raffinate 13 enters cobalt/nickel/zinc removal ion exchange unit 15; however, mass balance tank 34' is not required. Raffinate tank 12 is also fluidically connected to cobalt/nickel/zinc removal ion exchange unit 15, specifically a first set of five columns 151 that is a part of the cobalt/nickel/zinc removal ion exchange unit 15. In another embodiment of the invention, cobalt/nickel/zinc removal ion exchange unit 15 may be fluidically connected to and receive raffinate 13 from copper removal ion exchange unit 18.

As shown in FIG. 2-4, raffinate 13 is then conveyed (e.g., pumped) from raffinate tank 12 to cobalt/nickel/zinc removal ion exchange unit 15, which comprises a carousel equipped with 24 columns 151-159 loaded with an ion exchange resin with a high affinity for both cobalt and nickel, such as bispicolylamine functionalized ion exchange resin. The carousel is also connected to a multiple port valve (not shown), which enables the carousel to be fluidically connected to other systems, making it part of eluate system 23, as well. The carousel configuration therefore permits loading, rinsing and eluting without changing vessels. The multiple port valve may also be operatively associated with a timer, so that apparatus 10 can be operated automatically. Other configurations for the cobalt/nickel/zinc ion exchange unit 15 are also possible.

Since raffinate tank 12 is fluidically connected to the first set of five columns 151, raffinate 13 is pumped through each column in the first set of five columns 151 in the down-flow direction. The first set of five columns 151 is arranged in parallel so that raffinate 13 enters each column at the top, flowing through to the bottom. As shown in FIGS. 2-4, the discharged raffinate 13 from the first set of five columns 151 is collected together and then conveyed (e.g., pumped) through a second set of five columns 152 arranged in a similar manner to the first set of five columns 151 so that the raffinate 13 enters each column at the top, flowing through to the bottom. As shown in FIGS. 2-4, the columns of the cobalt/nickel/zinc removal ion exchange unit 15 are moving in a first direction (e.g., from right to left direction as indicated by arrows 38); however, the raffinate 13 is being fed into the first and second sets of columns 151, 152 in a second direction countercurrent to the direction of arrows 38 (e.g., left to right as shown on FIGS. 2-4). It is believed that feeding the raffinate 13 in the second direction countercurrent to the first direction increases the efficiency of the ion exchange resin with which the columns 151-159 are loaded.

Raffinate 13 discharged from the second set of columns 152 is collected and conveyed to barren tank 30, which is fluidically connected to receive outflow from the second set of columns 152. Barren tank 30 is fluidically connected to mass balance tank 34" which is provided so that the composition of the discharged raffinate 13 can be determined; however, mass balance tank 34" is not required. In one embodiment, there were no detectable amounts of cobalt and nickel in the discharged raffinate 13 contained in barren tank 30; however, small amounts of zinc were detected (e.g. from about 78 ppm to about 163 ppm). In another embodiment shown in FIG. 3, zinc levels may be reduced by sending the discharged raffinate 13 for a third pass, in a down-flow direction through two columns 158 which are arranged in parallel instead of sending the discharged raffinate 13 directly to barren tank 30, a shown in FIG. 3 Two columns 158 are fluidically to the second set of columns 152 from which they receive an intake flow of the discharged raffinate 13; the two columns 158 are also fluidically connected to barren tank 30 which receives the outflow of raffinate 13 from the two columns 158.

As the ion exchange resin moves through the first and second sets of columns 151, 152, it becomes more fully loaded with cobalt, nickel and zinc to the point of equilibrium between the ion exchange resin and raffinate 13, such that raffinate 13 is at full strength (i.e., cobalt, nickel and zinc have not been removed). Raffinate 13 at full strength needs to be displaced from the cobalt/nickel/zinc removal ion exchange unit 15 to the first set of columns 151. Two columns 153 may be used to achieve the displacement. See FIGS. 2 and 3. The two columns 153 are fluidically connected to cobalt/zinc eluate tank 28 to receive cobalt/zinc eluate as an intake flow. Using cobalt/zinc eluate for displacement, as opposed to water, for example, may result in better cobalt recovery. Since the two columns 153 are loaded with cobalt/zinc eluate when the eluting 113 of cobalt and zinc takes place, without dilution from water, cobalt concentration is higher. In addition, two columns 153 are fluidically connected to an inlet end of the first set of columns 151 so that displaced raffinate 13 mixes with raffinate 13 from raffinate tank 12

After full loading of the columns with nickel, zinc and cobalt, those metals are stripped by means of eluate system 23. In addition to copper eluent tank 17, eluate system 23 comprises cobalt/zinc eluent tank 27 and nickel eluent tank 26. Cobalt/zinc eluent tank 28 and nickel eluent tank 29 are fluidically connected to cobalt/nickel/zinc removal ion exchange unit 15 so that, at the appropriate point, either cobalt/zinc eluent or nickel eluent can be added to the cobalt/nickel/zinc removal ion exchange unit 15 to strip either nickel or cobalt and zinc from the loaded resin. Since cobalt does not adhere as strongly to the resin as nickel, cobalt may be considered easier to remove than nickel, using an acid concentration weaker than that required to strip the nickel. Therefore, in the embodiments shown in FIGS. 2-4, cobalt and zinc are removed first. Cobalt/zinc eluent tank 27 is sized for holding cobalt/zinc eluent which comprises $H_2SO_4$ in concentration of about 2% to about 4%, preferably between 2.5% to 3.85% ("weak $H_2SO_4$"), although weak concentrations of other strong acids may also be used. In the embodiment shown in FIGS. 2-4, cobalt/zinc eluent comprises $H_2SO_4$ in concentration of about 2% to about 3.5%. Cobalt/zinc eluent tank 27 is fluidically connected to four columns 154 connected in series so that the cobalt/zinc eluent enters each column within the four columns 154 at the bottom and exits at the top, as shown in FIGS. 2 and 3. Cobalt and zinc are therefore eluted 113 (e.g., stripped) from the bispicolylamine functionalized ion exchange resin in solution as copper/zinc eluate. Cobalt/zinc eluate is conveyed to cobalt/zinc eluate tank 28 which is fluidically connected with the last column in the four columns 154 the last column in the four columns 154 is also fluidically connected to mass balance tank 34"". Mass balance tank 34"" allows cobalt/zinc eluate to be analyzed to determine its composition; however, mass balance tank 34"" is not required.

Nickel is the next metal to be eluted 116; however, nickel is to be eluted 116 with nickel eluent which is about 10 times stronger than cobalt/zinc eluent (~20% v. ~2%). Therefore, just as the raffinate 13 at full strength needed to be displaced from the cobalt/nickel/zinc removal ion exchange unit, so does the cobalt/zinc eluent (weak $H_2SO_4$) need to be displaced. Two columns 155 may be used to achieve the displacement. See FIGS. 2 and 3. The two columns 155 are fluidically connected to nickel eluate tank 28 in series to receive nickel eluate as an intake flow. Using nickel eluate for displacement, as opposed to water, for example, may result in better nickel recovery. Since the two columns 155 are loaded with nickel eluate when the eluting 116 of nickel takes place, without dilution, nickel concentration may be higher.

Nickel is next removed. Nickel eluent tank 26 is sized for holding nickel eluent which comprises $H_2SO_4$ in concentration of about 20% or 200 g/L, although other high concentrations of strong acid could also be used. Nickel eluent tank 26 is fluidically connected to three columns 156 connected in series so that the nickel eluent enters each column within the three columns 156 at the bottom and exits at the top, as shown in FIGS. 2 and 3. Nickel is therefore eluted 116 (e.g., stripped) from the bispicolylamine functionalized ion exchange resin in solution as nickel eluate. Nickel eluate is conveyed to nickel eluate tank 29 which is fluidically connected with the last column in the three columns 154; the last column in the three columns 154 is also fluidically connected to mass balance tank 34′′′. Mass balance tank 34′′′ allows nickel eluate to be analyzed to determine its composition; however, mass balance tank 34′′′ is not required.

After nickel is eluted 116, the nickel eluent in the three columns 154 is displaced using nickel eluent rinse water. Nickel eluent rinse water tank 36 is sized to hold nickel eluent rinse water and is fluidically connected to three columns 157 in series as shown in FIG. 2. Once the nickel eluent rinse water has displaced the nickel eluent, the nickel eluent is recycled into the eluate system 23. In another embodiment as shown in FIG. 4, displacement of nickel eluent may be achieved by using discharged raffinate 13 from barren tank 30. In that embodiment, nickel eluent rinse water tank 36 is eliminated and the three columns 157 in series are instead fluidically connected to barren tank 30.

In yet another embodiment of apparatus 10, the system for eluting 116 nickel is a recycled system in which a single vessel holds nickel eluent and nickel eluate. Nickel eluent/eluate tank 32 is sized to hold both nickel eluent and the nickel eluate produced through the elution 116 of nickel in four columns 159. Nickel eluent/eluate tank 32 is fluidically connected to the four columns as shown in FIG. 3. Recirculation of the nickel eluate permits the concentration of nickel to build up in the nickel eluate before recovering the nickel or replacing the combined nickel eluent/eluate solution.

The various elements of apparatus 10 as described in FIGS. 1-4 may be combined in still other embodiments, as would be familiar to a person of ordinary skill in the art after becoming familiar with the teachings of the present invention.

Figure 6:
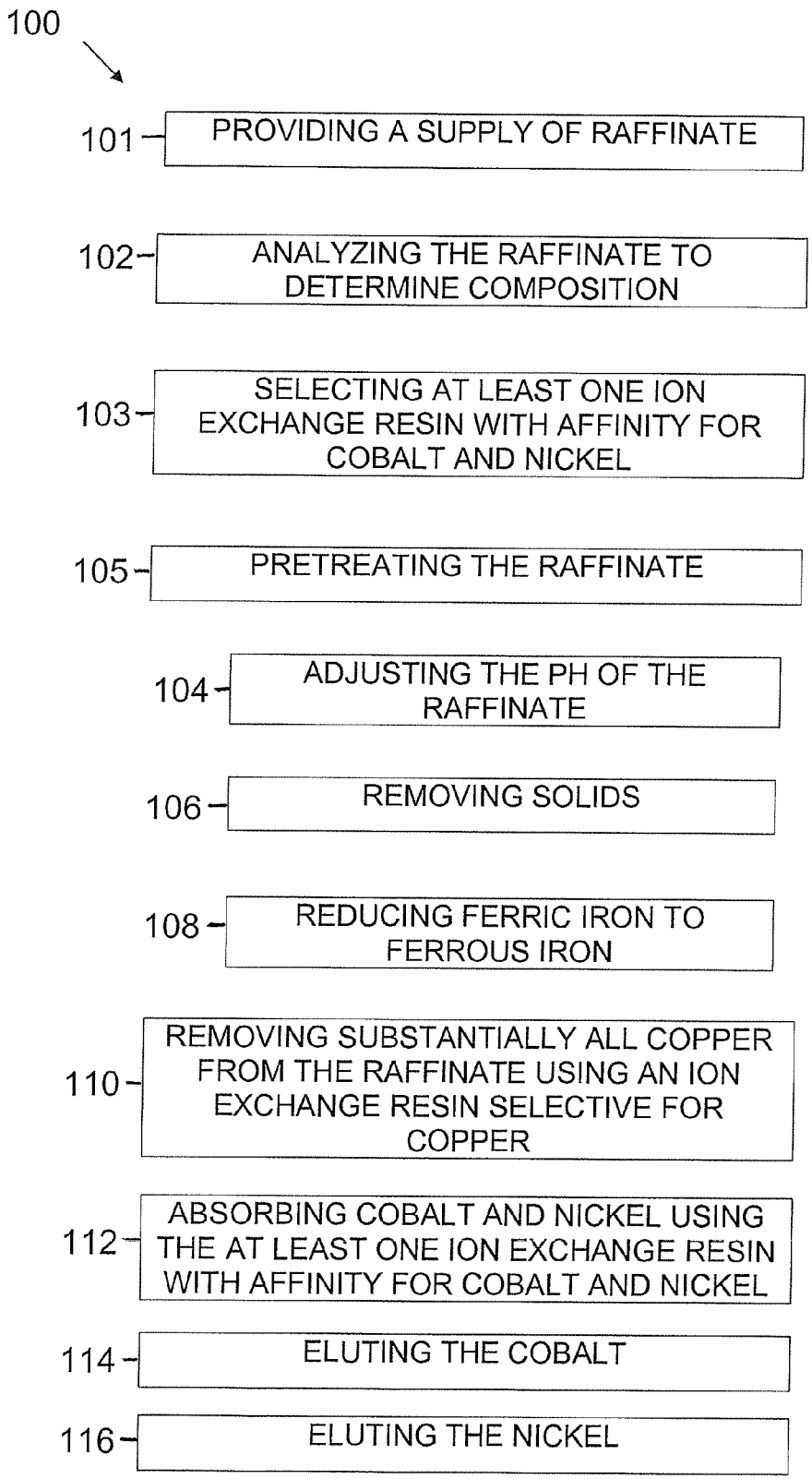
FIG. 6 illustrates an embodiment of a method for recovering copper, nickel and cobalt from raffinate.
Figure 7:
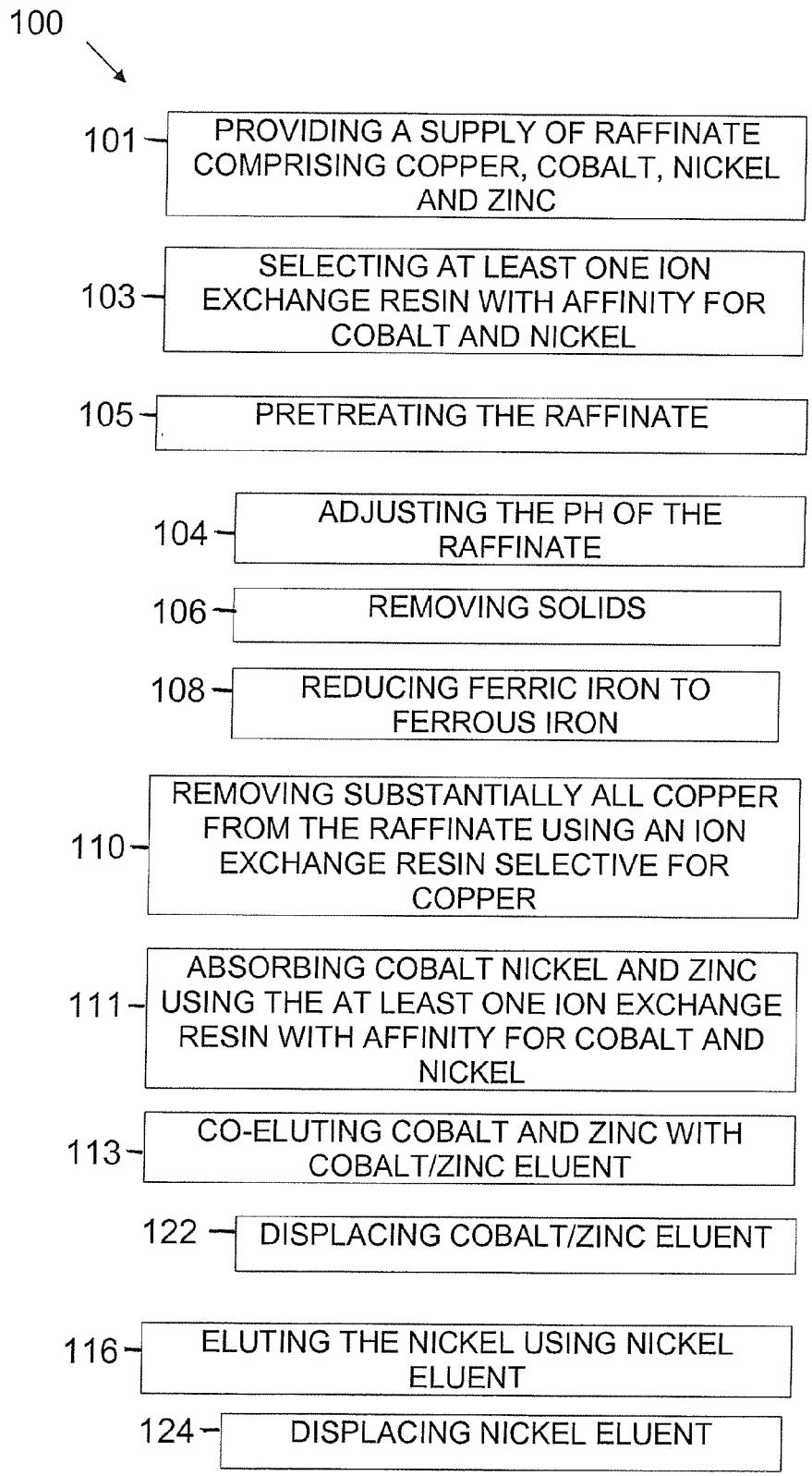
FIG. 7 illustrates an embodiment of a method for recovering copper, nickel, cobalt and zinc from raffinate.

Referring to FIGS. 6 and 7, method 100 for extracting cobalt from raffinate 13 will now be described. Method 100 comprises providing 101 a supply of raffinate 13. Providing 101 the supply of raffinate may comprise adding raffinate 13 to process tank 14. Since the embodiments of method 100 may depend on the constituents in the raffinate 13, method 100 comprises analyzing 102 raffinate 13 to determine the composition of raffinate 13, including identification of the metals and other elements present. In one embodiment, raffinate 13 comprises cobalt, copper, iron and nickel. Raffinate 13 also may include other metals, such as magnesium and zinc. Variously, raffinate 13 analyzed 102 in accordance with method 100 was determined to contain combinations of copper (about 125 to about 150 parts per million (ppm)), cobalt (about 50 to about 55 ppm), nickel (about 40 to about 45 ppm), iron (about 500 to about 600 ppm total for ferric, ferrous or combined), magnesium (about 7700 ppm) and zinc (about 300 ppm) at pH range from about 1.45 to about 1.8. See FIG. 4.

Method 100 further comprises selecting 103 at least one ion exchange resin to separate out metals from raffinate 13. In an embodiment of method 100, selecting 103 at least one ion exchange resin comprises choosing a resin with high affinity for nickel and cobalt, such as bispicolylamine. Given that bispicolylamine also has high affinity for copper such that copper may load preferentially, another ion exchange resin with high affinity for copper, such as hydroxypropylpicolylamine functionalized resin, may also be selected 103 so that copper can be removed from raffinate 13 before the raffinate 13 comes in contact with bispicolylamine functionalized resin. However, in another embodiment, as explained herein, copper may be removed from raffinate 13 using SX processes.

Method 100 may further comprise pretreating 105 raffinate 13. Selection 103 of various resins may have an effect on what kind of pretreatment 105 steps may be necessary or advantageous, if any, because the selected resins may perform more advantageously under certain conditions. Therefore, pretreating 105 raffinate 13 may comprise pretreating 105 in a manner that allows substantially all copper to be removed from raffinate 13. As discussed above, pretreating 105 raffinate 13 may comprise any or all of the steps of adjusting 104 (e.g., raising) the pH of raffinate 13, removing 106 any solids produced as a result of the adjusting 104 process, or reducing 108 iron from ferric iron to ferrous iron. In embodiments of method 100, adjusting 104 (e.g., raising) the pH and reducing 108 ferric iron are preferably undertaken prior to removing 100 substantially all the copper in the ion exchange system 19, because copper catalyzes iron reduction; therefore, it is more likely that iron would reoxidize if the pH were adjusted 104 after removing 100 substantially all the copper. Pretreating 105 the raffinate may be performed in process tank 14 or in other similar vessels.

Adjusting 104 the pH of raffinate 13 in embodiments of method 100 comprises raising the pH of raffinate 13 to between about 3 and about 3.7, preferably between about 3 and 3.5. Depending on the metals present in the raffinate 13, as well as the parameters of the ion exchange resin selected 103, other pH levels may be preferred. In the embodiments described herein, raising the pH level of raffinate 13 comprises adding CaO or $CaCO_3$ or other similar compound to raffinate 13 in process tank 14 in amounts effective to raise the pH to between about 3 and about 3.7, preferably between about 3 and 3.5; however, other chemical reagents could also be used as would be familiar to one of ordinary skill in the art after becoming familiar with the teachings of the present invention. More specifically, in embodiments of the invention, CaO may be added to raffinate 13 at a rate of about 2 grams per liter (g/L) to about 4 g/L; these amounts may vary depending on whether a continuous feed process or batch process is employed. In the embodiment shown in FIG. 5, CaO was added at a rate of 10 pounds per minute (lbs./min.) with raffinate 13 feed rate of 350 gallons per minute (gal./min.). Adjusting 104 the pH of raffinate 13 may further comprise stirring raffinate 13 during and after addition of CaO, especially where batch processes are employed.

Since raising the pH as just described tends to produce solids (e.g., gypsum) that may clog ion exchange system 19, method 100 may further comprise removing 106 solids from raffinate 13. Removing 106 solids may comprise using a variety of commercially available coagulants and flocculents, such as Nalco N8850 coagulant and N7871, which are added to process tank 14 following pH adjustment, causing solids to form coagulated solids. Removing 106 solids may therefore further comprise filtering raffinate 13 to remove coagulated and other solids, such as through drum filter 16 or other filtering or known physical separation methods. Removing 106 solids may further comprise additional filtering (e.g., with an inline cartridge filter) prior to removing 110 substantially all copper in the ion exchange system 19, as explained in more detail below.

Figure 1A:
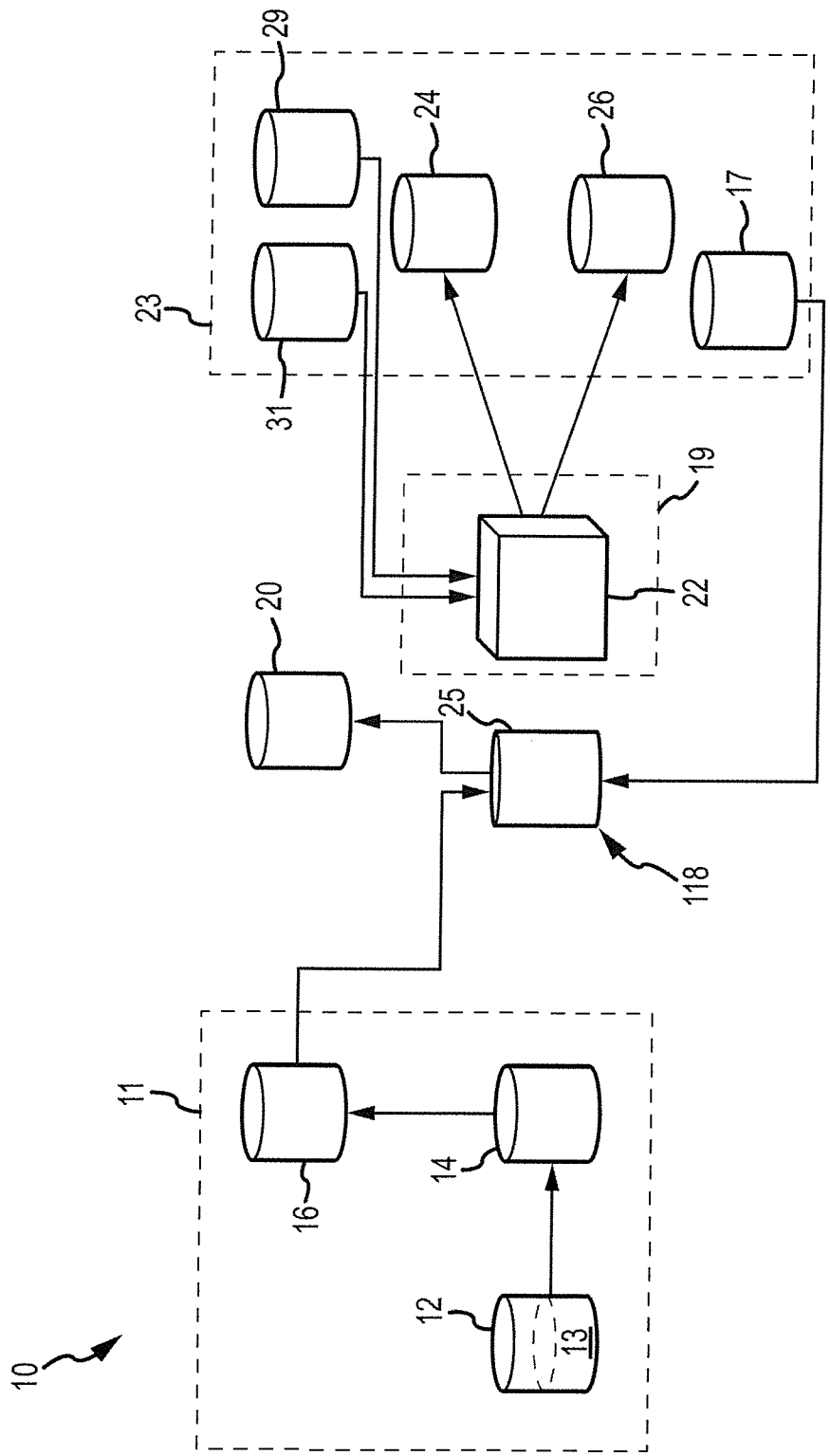
Figure 5:
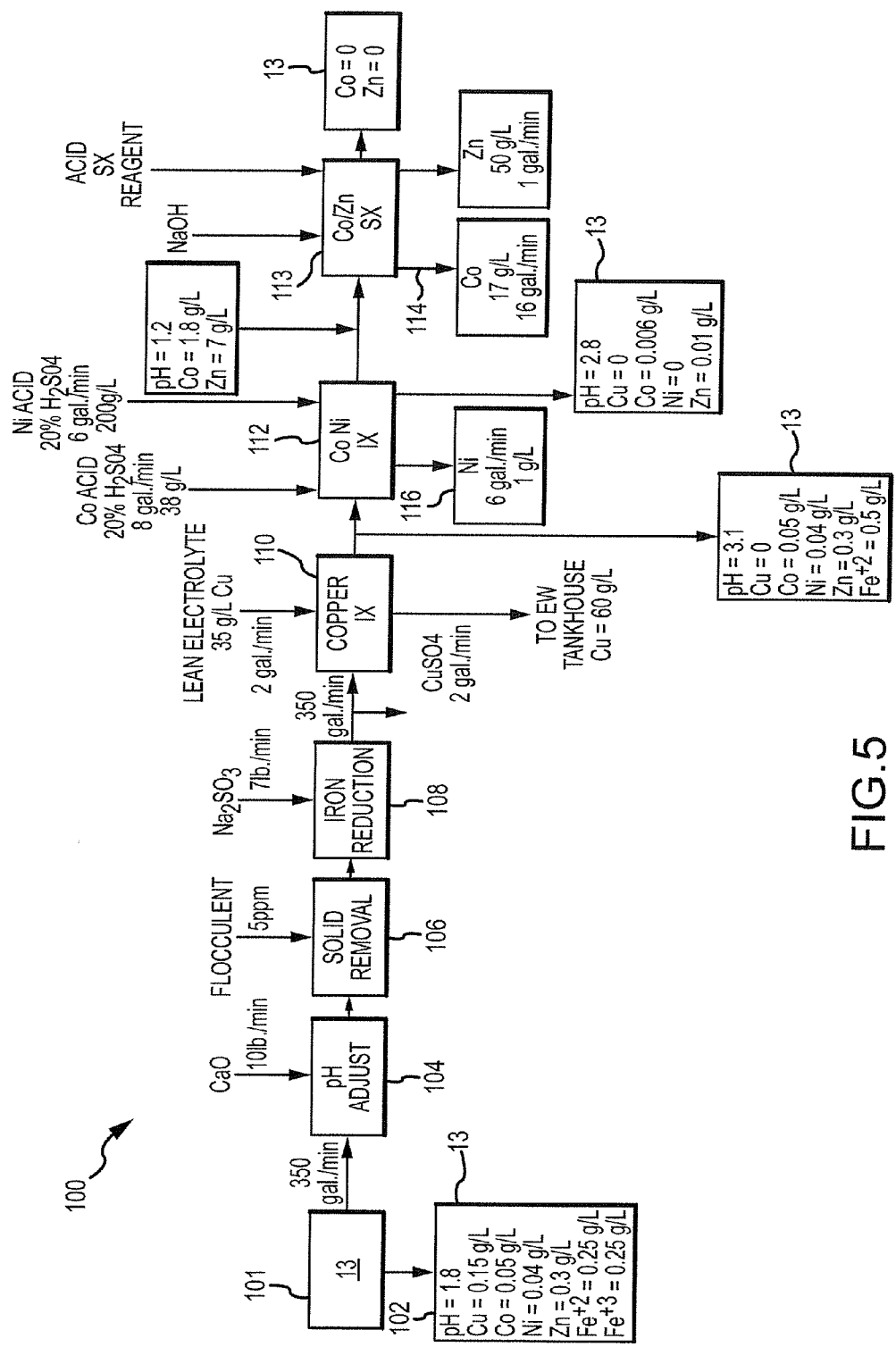
FIG. 5 illustrates an embodiment of a method for recovering copper, nickel, cobalt and zinc from raffinate.
Figure 8:
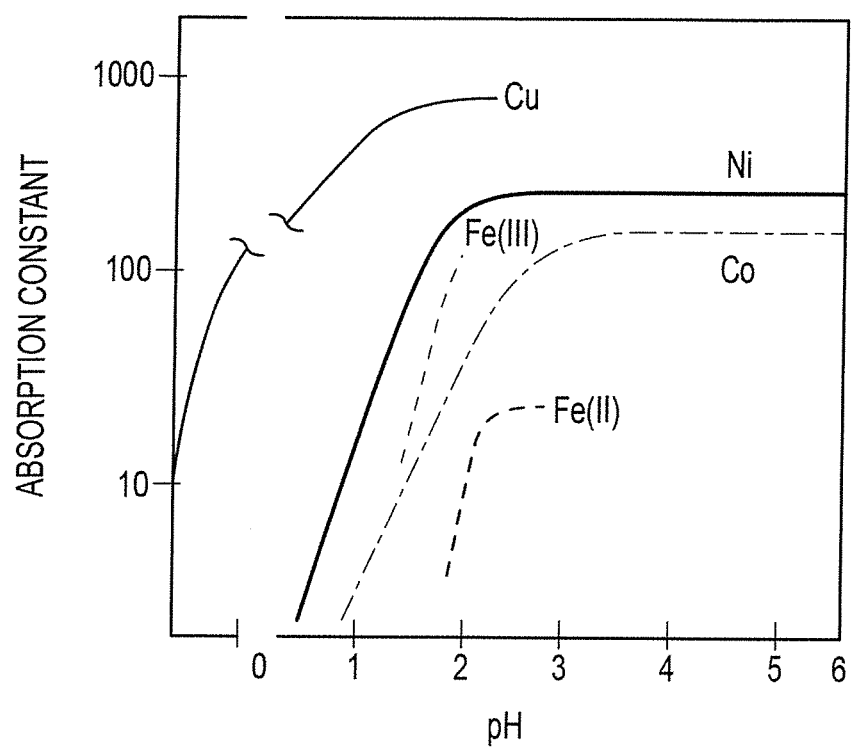
FIG. 8 is a graph showing affinities of bispicolylamine resin for various metals at different pH levels.

Given the varying affinities of bispicolylamine for ferric iron (Fe III) and ferrous iron (Fe II) at low pH as shown in FIG. 8, pretreating 105 raffinate 13 according to method 100 further comprises reducing 108 ferric iron to ferrous iron so that cobalt will load the resin preferentially instead of iron. In one embodiment, reducing ferric iron to ferrous iron may comprise reducing substantially all ferric iron. Reducing 108 ferric iron to ferrous iron comprises adding sodium sulfite ($Na_2SO_3$) to raffinate 13 in an amount effective to reduce all of the ferric iron to ferrous iron. $Na_2SO_3$ may be added at a rate of 1 g/L of raffinate 13 in one embodiment. In another embodiment as shown in FIGS. 1A and 5, in which raffinate 13 was fed at a rate of 350 gallons per minute, $Na_2SO_3$ was added at a rate of 7 lbs./min. Of course, if raffinate 13 contains only ferrous iron, no reducing 108 is necessary.

FIG. 8 also illustrates the high affinity that bispicolylamine functionalized resin has for copper; thus, method 100 further comprises removing 110 substantially all copper from raffinate 13. Removing 110 substantially all copper from raffinate 13 comprises using copper SX or a first ion exchange resin selective to copper.

In an embodiment wherein copper SX is used, removing 110 substantially all copper from raffinate 13 comprises adding a high percentage (e.g., about 10% by volume) of metal extraction reagent (e.g., oxime or the equivalent aldoxime, ketoxime or the equivalent) in aqueous solution to the raffinate in copper SX unit 118. In one embodiment, removing 110 substantially all copper may be accomplished using aldoxime, although ketoxime or the equivalent may be used. Oximes, including aldoxime and ketoxime, are commercially available from Cytec Corporation, Tempe, Ariz. as Acorga reagents, such as Acorga 5910. The metal extraction reagent attaches to the copper so that substantially all of the copper is removed 110 from raffinate 13. Removing 110 substantially all copper may further comprise recovering copper from the metal extraction reagent in solution by stripping it with copper eluent, which in one embodiment comprises a strong acid (e.g., $H_2SO_4$) at a concentration of about 150 g/L to about 200 g/L or lean electrolyte (e.g., containing about 35 g/L copper). The copper is recovered as $CuSO_4$ in solution which is removed to copper recovery vessel 20, including the EW tankhouse, where copper is plated out using EW processes.

In an embodiment of method 100 in which removing 110 substantially all copper comprises using a first ion exchange resin selective to copper, the first ion exchange resin may comprise hydroxypropylpicolylamine functionalized resin. Using the first ion exchange resin preferably occurs prior to absorbing 112 cobalt and nickel using a second ion exchange, such as bispicolylamine functionalized resin. Otherwise, the second ion exchange resin will bind preferentially to the copper, leaving no room for cobalt (and nickel) to bind. Removing 110 substantially all copper from raffinate 13 comprises feeding raffinate 13 (that has been pretreated 105) through copper removal ion exchange unit 18 as described herein in a manner that permits substantially all copper to load the first ion exchange resin (e.g., hydroxypropylpicolylamine functionalized resin) contained in the copper removal ion exchange unit 18. In an embodiment in which copper removal ion exchange unit 18 comprises the fixed bed system of multiple columns in lead lag configuration, raffinate 13 is pumped into the top of the lead column 21 where it exits through the bottom of the lead column 21 and is pumped into the top of lag column 25, exiting lag column 25 free of substantially all copper. Removing 110 substantially all copper from raffinate 13 comprises stripping or eluting the copper from the first ion exchange resin and regenerating the beds with copper eluent. Copper eluent may comprise $H_2SO_4$ or lean electrolyte (containing copper and strong acid, such as $H_2SO_4$). In the embodiment shown in FIG. 5, copper eluent comprises lean electrolyte comprising 35 g/L copper, that is fed through the copper removal ion exchange unit 18 at a rate of 2 gal./min. where the feed rate of raffinate 13 is 350 gal./min. In one embodiment, copper eluent is fed through the copper removal ion exchange system 18 countercurrent to the feed direction of raffinate 13. For example, where raffinate 13 is fed in a down-flow direction, copper eluent is fed in an up-flow direction. In one embodiment wherein copper eluent comprises either $H_2SO_4$ or lean electrolyte, raffinate 13 is displaced using 20% $H_2SO_4$ to regenerate the beds; displacement may be done at a slower flow rate than the rate used to load the beds with raffinate 13. In yet another embodiment in which copper eluent comprises lean electrolyte, 20% $H_2SO_4$ may be used to displace the lean electrolyte and water may be used to displace the 20% $H_2SO_4$ prior to loading the beds again with raffinate 13. In another embodiment, water displacement may be employed before using copper eluent to strip the copper.

Figure 9:
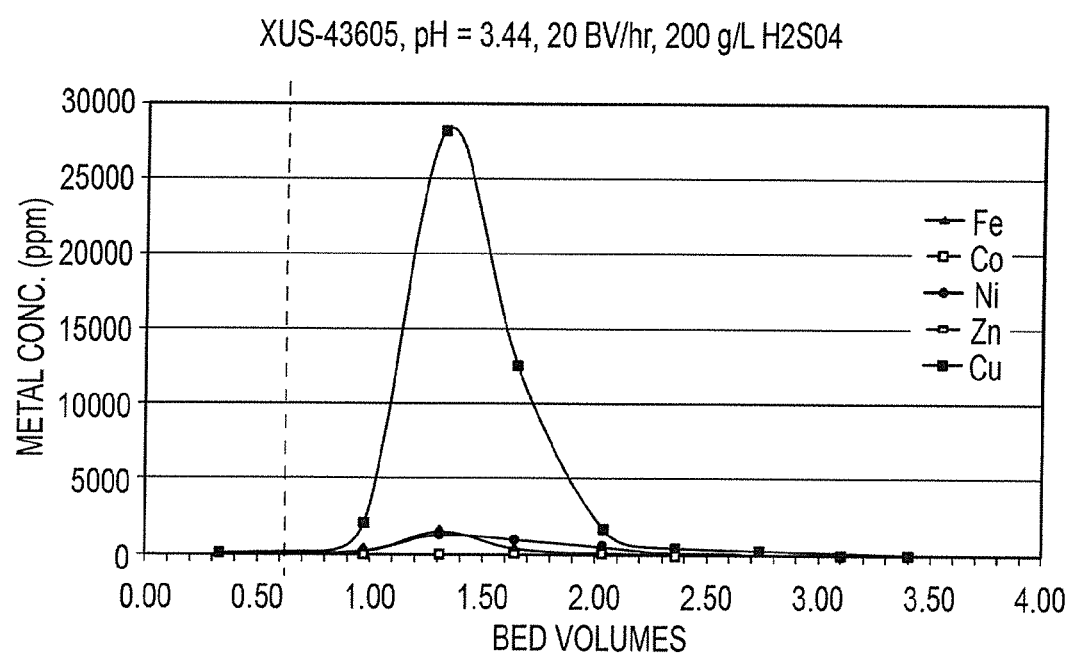
FIG. 9 is a graph showing copper recovery according to one embodiment of the invention.

The copper is recovered as $CuSO_4$ and is of high purity as shown in FIG. 9; thus, recovering 110 substantially all copper in raffinate 13 further comprises conveying the copper in solution to the EW tankhouse. In the embodiment shown in FIG. 5, removing 110 substantially all copper from raffinate 13 yielded 60 g/L of copper.

Once substantially all copper has been removed 110, raffinate 13, minus the copper, is subjected to additional ion exchange processes. Thus, method 100 comprises absorbing 112 cobalt and nickel from raffinate 13 using the second ion exchange resin, e.g. bispicolylamine functionalized resin. In an embodiment in which raffinate 13 further comprises zinc, method 100 comprises absorbing 111 cobalt, zinc and nickel using the second ion exchange resin, e.g. bispicolylamine functionalized resin. Absorbing 111 cobalt, zinc and nickel may comprise supplying the columns with raffinate 13 in a countercurrent direction, as described above.

Once the second ion exchange resin is fully loaded or substantially fully loaded, method 100 may comprise eluting 114 the cobalt from the second ion exchange resin, e.g., bispicolylamine functionalized resin. Since cobalt does not adhere as strongly to the second ion exchange resin as does nickel, cobalt may be considered easier to remove than nickel, using an acid concentration weaker than that required to strip nickel. Therefore, in embodiments of method 100, eluting 114 the cobalt from the second ion exchange resin comprises using cobalt eluent to strip the cobalt from the second ion exchange resin. In one embodiment, cobalt eluent comprises weak $H_2SO_4$ in concentration of about 2% to about 4% by volume, preferably between 2.5% to 3.85% by volume; however, other weak concentrations of other strong acid may also be used. Eluting 114 cobalt further comprises removing cobalt in solution after cobalt has been stripped from the second ion exchange resin. Eluting cobalt 114 may further comprise displacing 120 cobalt eluent so that the second ion exchange resin may be regenerated. Displacing 120 cobalt eluent may comprise using cobalt eluate.

In another embodiment in which raffinate 13 further comprises zinc, eluting 114 cobalt comprises co-eluting 113 cobalt and zinc from the second ion exchange resin. Co-eluting 113 the cobalt and zinc from the second ion exchange resin comprises using cobalt/zinc eluent to strip the cobalt and zinc from the second ion exchange resin. In one embodiment, cobalt/zinc eluent comprises weak $H_2SO_4$ in concentration of about 2% to about 4%, preferably between 2.5% to 3.85%; however, other weak concentrations of strong acid may also be used. Cobalt/zinc eluent may be the same substance as cobalt eluent. In an embodiment of method 100, cobalt and zinc may remain combined in solution without need for further separation. Co-eluting 113 cobalt and zinc may further comprise displacing 122 cobalt/zinc eluent so that the second ion exchange resin may be regenerated. Displacing 122 cobalt/zinc eluent may comprise using cobalt/zinc eluate.

In another embodiment, co-eluting 113 cobalt and zinc may further comprise eluting cobalt 114 and eluting 118 zinc from the cobalt/zinc eluate. In one embodiment shown in FIG. 5, zinc is extracted from the cobalt/zinc eluate by means of an acidic SX reagent that extracts zinc and any residual iron, leaving cobalt in solution. In one embodiment, the acidic SX reagent comprises bis(2,4,4-trimethylpentyl)phosphinic acid, which is commercially available as CYANEX® 272 from Cytec Industries, Inc. of Tempe, Ariz., although other phophinic and phosphoric acids may also be used. Extraction may be enhanced by adjusting 104 the pH of cobalt/zinc eluate, which may also include residual iron. In the embodiment shown in FIG. 5, sodium hydroxide (NaOH) at a rate of 1.6 gal./min. and a concentration of 1 molar (M), was used to raise the pH to about 3.5, although other strong bases could also be used. As used herein, "strong base" means hydroxides of alkali metals and certain alkaline earth metals, such as potassium hydroxide (KOH), barium hydroxide $Ba(OH)_2$ and NaOH. In one embodiment, due to the acid produced during elution 114, 118, additional pH adjustment 104 may be desirable for enhancing zinc recovery. Substantially all zinc (e.g., about 99.8%) may be extracted with $H_2SO_4$ (or lean electrolyte) in one stage using an extraction ratio of about 3:1 organic to aqueous phase (O/A). However, since in one embodiment about 30 g/L acid are consumed during elution 114, 118, acid or lean electrolyte of about 40 to about 50 g/L may be desirable. Table 1 below shows a comparison of extraction 0/A ratios in relation to zinc recovery. As shown in FIG. 2, zinc may be stripped from the acidic SX reagent, using $H_2SO_4$ at a rate of 1 gal./min. and a concentration of about 30-60 g/L, resulting in 50 g/L of zinc at a rate of 1 gal./min. Cobalt content in solution was 17 g/L at a rate of 1.6 gal./min. See FIG. 5. In another embodiment in which iron may build up in the organic, concentration of $H_2SO_4$ may be raised to about 180 g/L in order to elute (e.g., strip out) substantially all the iron.

TABLE 1

| Extract O/A | % Recovery | Raffinate g/L | Strip O/A | Recov. Zn | LE/Acid Consumed g/L |
|---|---|---|---|---|---|
| 1 | 79.2% | 1.25 | 4.2 | 20 | 30 |
| 1.2 | 96.7% | 0.2 | 4.1 | 20 | 30 |
| 1.5 | 98.5% | 0.09 | 5.1 | 20 | 30 |
| 2 | 99.2% | 0.05 | 6.7 | 20 | 30 |
| 3 | 99.8% | 0.01 | 10.0 | 20 | 30 |

In another embodiment, the acidic SX reagent may comprise di-2-ethyl-hexyl phosphoric acid; however, in that case the pH may be adjusted to about 2 to about 2.5. Due to the acid generated during stripping, additional pH control may be desirable for increased recovery. In one embodiment, 6 g/L of zinc recovered would generate 9 g/L of acid. Thus, depending on the acidic SX reagent used, the pH may be adjusted to between about 2 to about 3.5.

In another embodiment, cobalt and zinc may be separated by means of additional ion exchange processes using an ion exchange resin that is more selective for zinc than for cobalt, such as a resin containing aminophosphonic acid (APA) functional groups as may be found in AMBERLITE IRC747 commercially available from The Dow Chemical Company. APA-containing resins are selective for zinc over cobalt.

After the cobalt has been eluted 114 or after the cobalt and zinc have been co-eluted 113, method 100 comprises eluting 116 nickel using nickel eluent which comprises $H_2SO_4$ in concentration of about 20% or 200 g/L; however, high concentrations of other strong acids could also be used. Eluting 116 nickel may further comprise displacing 124 nickel eluent so that the second ion exchange resin may be regenerated. Displacing 124 nickel eluent may comprise using nickel eluate. In another embodiment, eluting 116 nickel may comprise recycling nickel eluent so that the nickel eluent becomes combined with the nickel eluate. The longer the recycling continues, the higher the concentration of nickel eluate, and therefore, the concentration of nickel in solution, than the concentration of nickel eluent.

According to one embodiment of method 100, a shown in FIG. 5, the expected recovery of metals may yield between about 80% to about 90% cobalt; between about 95% to about 98% nickel; between about 95% to about 100% copper; and between about 60% to about 70% zinc. In one embodiment, yields were about 87% cobalt, about 98% nickel, about 100% copper and about 67% zinc.

In order to provide further information regarding the invention, the following examples are provided. The examples presented below are representative only and are not intended to limit the invention in any respect.

EXAMPLES 1-3

Examples 1-3 involved testing of laboratory samples of raffinate 13.

Figure 10A:
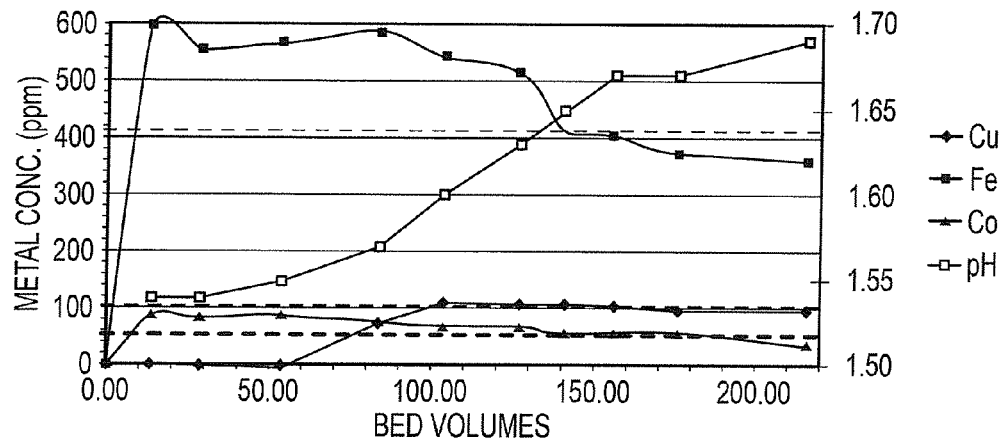
FIG. 10 shows graphs of the loading and elution of metals from Example 1 according to an embodiment of the present invention.
Figure 10B:
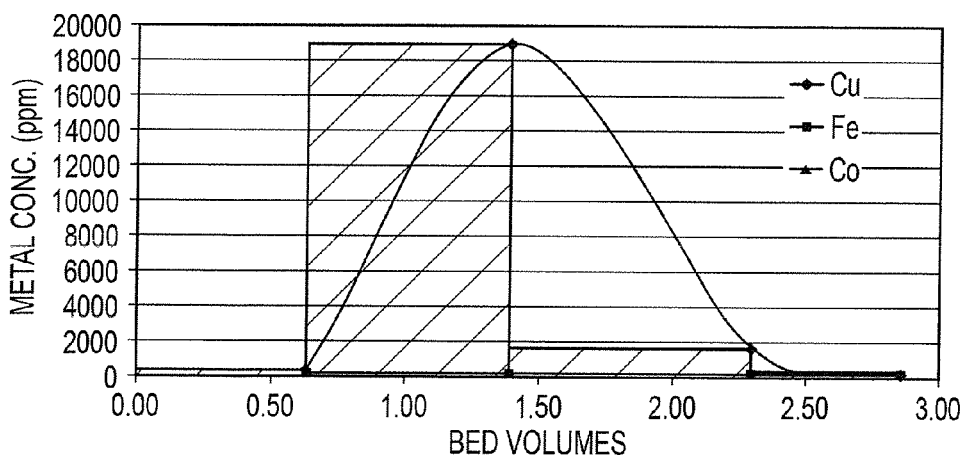
Figure 17:
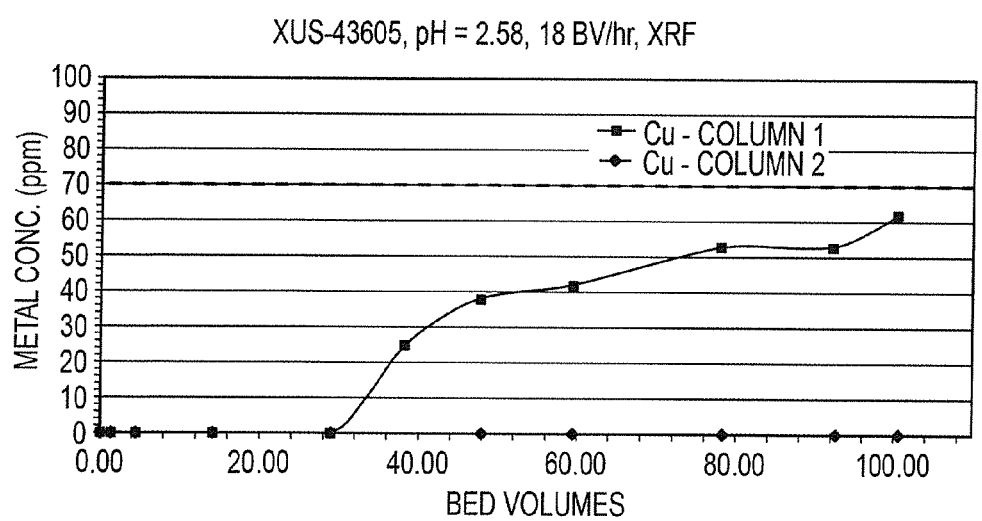
FIG. 17 is a graph showing copper loading in Example 12 according to an embodiment of the present invention.

In Example 1, raffinate 13 was made in the lab to test copper recovery; the raffinate 13 comprised copper, ferric iron, nickel, and magnesium sulfate at a pH of 1.72 to enhance copper loading on the hydroxypropylpicolylamine resin. A column was supplied with 20 milliliters (mL) resin and heated to approximately 50° C. The raffinate was pumped through the column at 20 bed volumes per hour (BV/hr). See FIG. 10. Iron and cobalt quickly broke through the bottom of the column in concentrations higher than their starting concentrations, indicating that the metals were displaced from the resin by the more strongly held copper. Copper eluted out of the resin between approximately 50 and 80 BV and completed loading by 100 BV. The resin was regenerated and copper eluted by rinsing the raffinate out of the resin in the column with water and then pumping 20% $H_2SO_4$ through the column at 5 BV/hr. Copper was successfully eluted and was loaded to 16.3 g/L resin. See FIG. 17.

In Example 2, raffinate 13 comprising ferric iron, nickel, and magnesium sulfate, and no copper, was prepared in the lab in order to test the recovery of cobalt and separation of cobalt from iron. It was assumed that raffinate 13 had already had substantially all copper removed 110. In Example 2, the pH of the raffinate was adjusted to a level of 2.8 for the highest potential of cobalt affinity for bispicolylamine resin. See FIG. 8. However, iron precipitated at 2.8 pH and plugged the column so the testing was stopped.

Figure 11A:
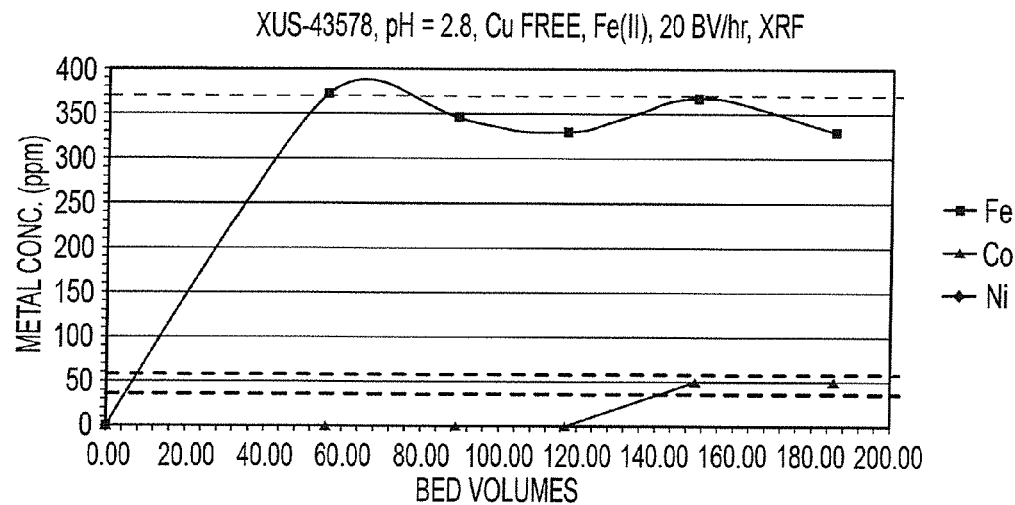
FIG. 11 shows graphs of the loading and elution of metals from Example 3 according to an embodiment of the present invention.
Figure 11B:
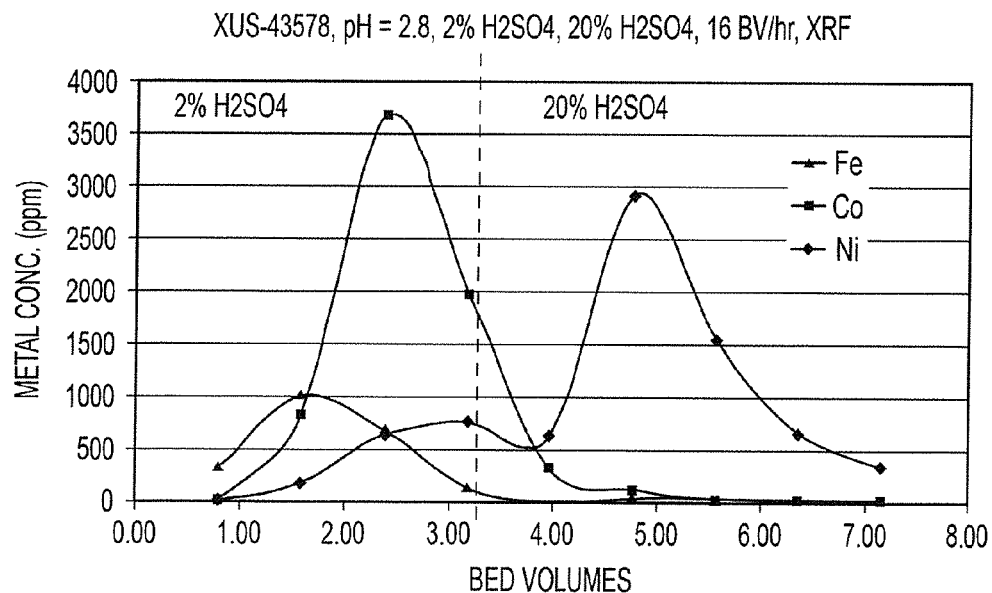

Example 3, raffinate 13 had the same composition as raffinate 13 in Example 2. $Na_2SO_3$ was added to raffinate 13 to reduce ferric iron to ferrous iron. Following reduction, raffinate 13 was pumped through a column of bispicolylamine functionalized resin heated to 50° C. at 20 BV/hr. Samples were taken. Cobalt broke through the column at between about 120 and about 140 BV with full breakthrough by 180 BV. Nickel (green band) and cobalt (red/pink band) could be seen as having loaded onto the resin together, with nickel being bound more strongly to the resin than cobalt. Cobalt and nickel were eluted in a two stages to separate them. Since cobalt is not held to the resin as firmly as nickel, cobalt can be removed with a weaker acid solution; therefore, cobalt was eluted from the resin with 2% $H_2SO_4$. Nickel was removed using 20% $H_2SO_4$. Some iron eluted with the cobalt which may have resulted form possible re-oxidation of iron, causing iron to reload on the column as ferric iron. Example 3 showed 5.5 g/L of cobalt loading, 6.1 g/L of nickel loading and 1.7 g/L of iron loading. See FIG. 11.

EXAMPLES 4-5

In Examples 4-5, raffinate 13 generated from copper SX at ASARCO's Ray Mine, Hayden, Ariz. was used for testing copper and cobalt removal.

Figure 12A:
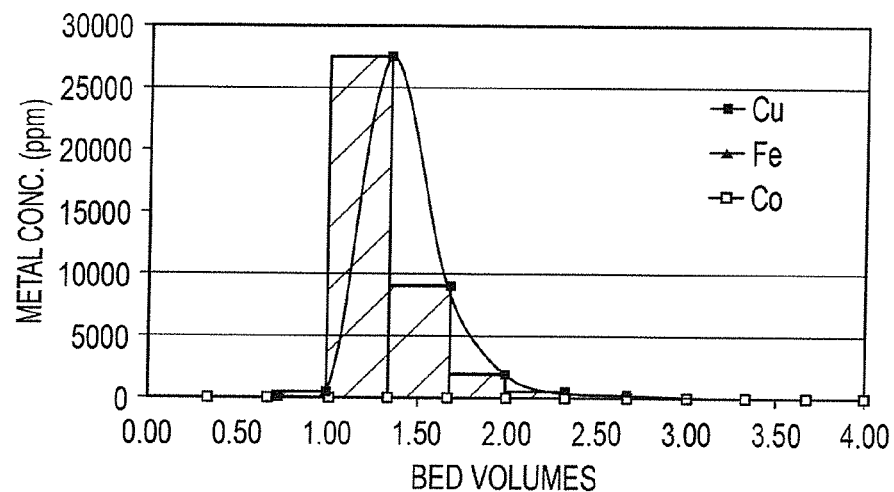
FIG. 12 shows graphs of the loading and elution of metals from Example 4 according to an embodiment of the present invention.
Figure 12B:
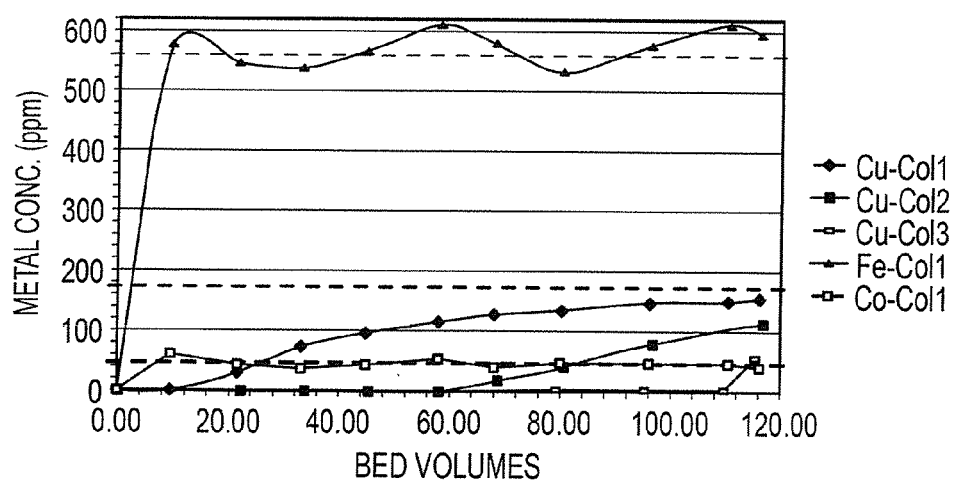

In Examples 4-5, raffinate 13 was tested using the same procedure for copper removal as in Example 1 for copper removal; however, since the iron was ferrous iron, no reduction was necessary. Multiple columns of bispicolylamine resin were placed in series to utilize copper capacity on the lead column without having copper breakthrough the bottom of the final column. In Example 4, copper loading occurred at a pH of 1.87 and raffinate 13 was fed through the columns at 20 BV/hr. Copper was stripped from the resin using 20% $H_2SO_4$ at the slower flow rate of 5 BV/hr. See FIG. 12.

Figure 13:
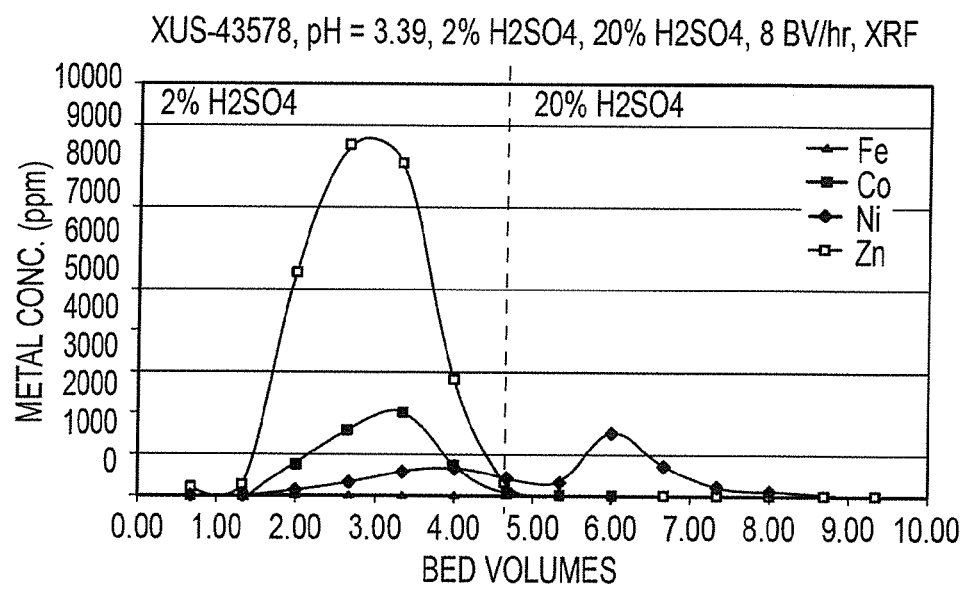
FIG. 13 is a of the elution of metals from Example 5 according to an embodiment of the present invention.

In Example 5, the copper-free raffinate generated during Example 4 was tested for cobalt removal using the same procedure employed in Example 3. CaO was added to the copper-free raffinate to achieve a pH of 3.39. Raffinate 13 was filtered to remove solids (e.g., gypsum) and pumped through the resin to recover both cobalt and nickel. Raffinate 13 was pumped through the columns for 90 BV/hr. Raffinate was removed from the columns with water. Cobalt and nickel were selectively eluted using 2% $H_2SO_4$ to strip the cobalt and 20% $H_2SO_4$ to strip the nickel. The elution curve showed significant presence of zinc. See FIG. 13.

EXAMPLE 6

Figure 14A:
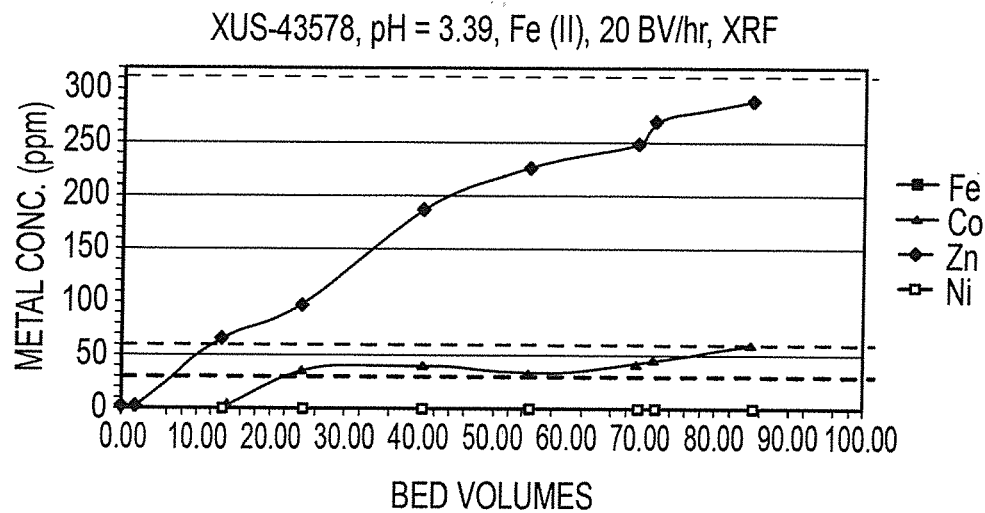
FIG. 14 shows graphs of the loading and elution of metals from Example 6 according to an embodiment of the present invention.
Figure 14B:
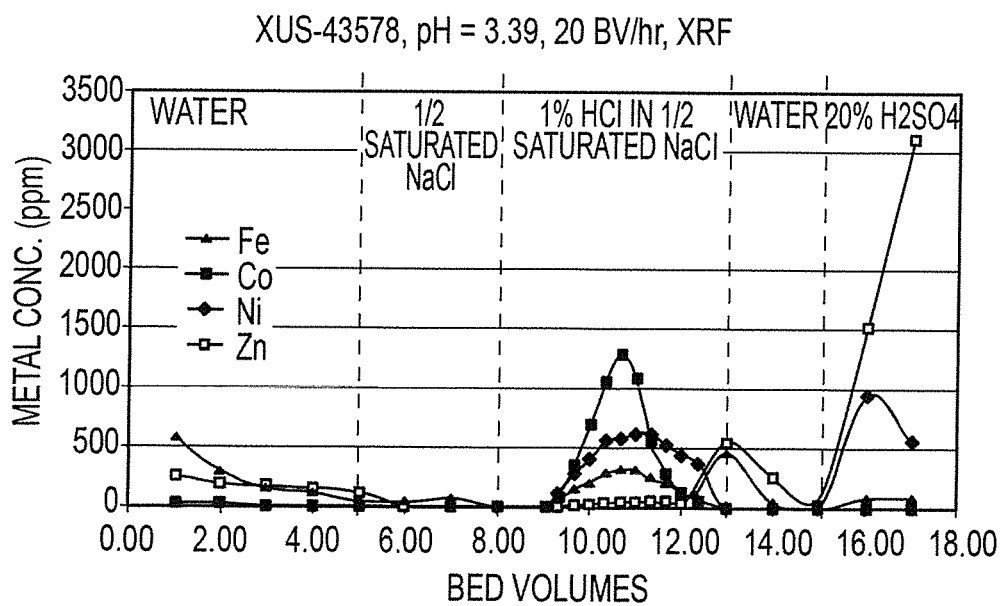

In Example 6, cobalt removal was tested with lab-prepared raffinate 13 comprising zinc, nickel, cobalt, ferrous iron and magnesium sulfate, minus copper and ferric iron, assuming that the steps of removing 110 substantially all copper and adjusting 104 the pH of raffinate 13 had already been completed. Raffinate 13 was loaded on bispicolylamine resin. Raffinate 13 was rinsed from the resin with water. A method for eluting cobalt, iron and nickel was tested. A solution half saturated with sodium chloride (NaCl) was passed through the resin to convert zinc to its anionic chloride form. Hydrochloric acid (HCl) (1%) in half-saturated NaCl was used to elute cobalt and iron (and some nickel) while keeping the anionic zinc loaded on the resin. The resin, which has weak base functionality, protonated in the strong acid solution, holding the anionic zinc while eluting the cationic cobalt, nickel and iron. Excess chloride was rinsed out of the resin with water, causing zinc to convert back to its cationic form that was then absorbed again by the chelating groups. 20% $H_2SO_4$ was used to strip the zinc as well as the residual nickel that was not removed with HCl. See FIG. 14.

EXAMPLE 7

Example 7 concerned methods for pH adjustment and iron reduction using raffinate 13 from the Ray Mine. Based on the results in FIG. 9, it was determined that determined that both steps may occur simultaneously prior to copper removal since copper catalyzes the reduction of iron with sulfite.

EXAMPLE 9

Cobalt was recovered using bispicolylamine resin at a pH of 2.8. These results demonstrated that cobalt will load on the resin at a pH in a range of about 2.7 to about 3.5.

EXAMPLE 10

Figure 15A:
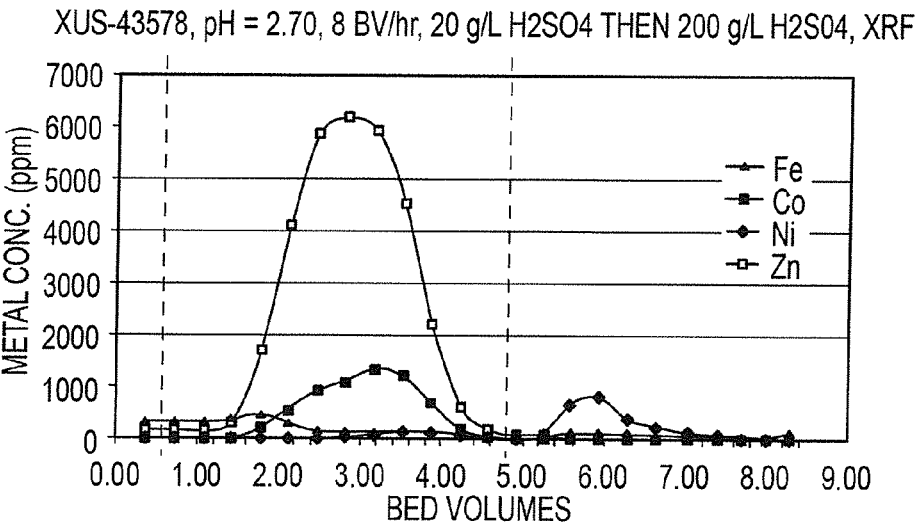
FIG. 15 shows graphs of the loading and elution of metals from Example 10 according to an embodiment of the present invention.
Figure 15B:
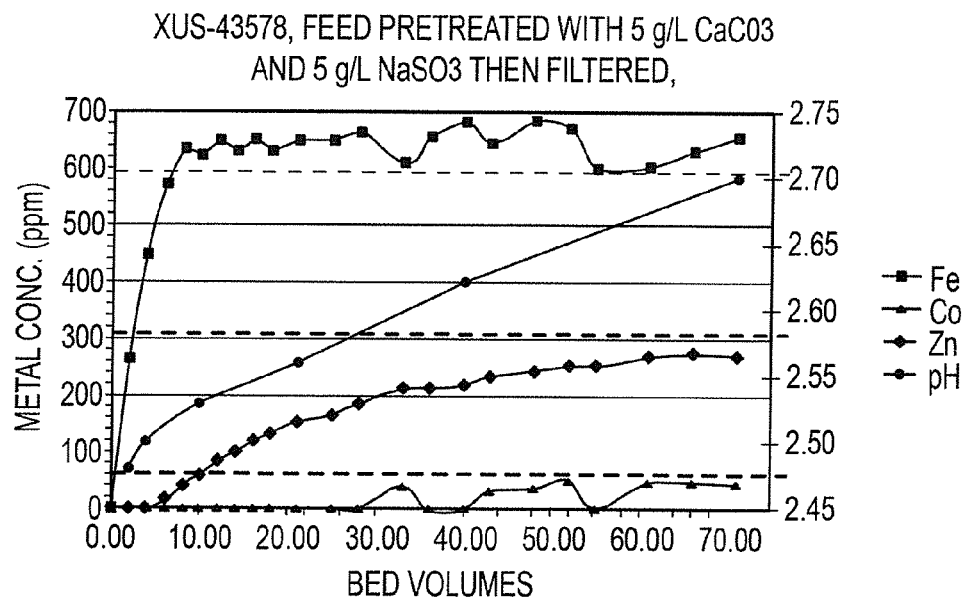

In Example 10, raffinate 13 was pretreated with $CaCO_3$ to adjust pH to 2.75 and with $NaSO_3$ to reduce iron and was filtered. The resin was loaded with cobalt, nickel and zinc from the pretreated raffinate at 20 BV/hr. Elution was done in two steps. Cobalt and zinc were eluted first with 2% $H_2SO_4$; nickel, with 20% $H_2SO_4$. The cobalt/zinc eluate had a cobalt concentration of 1-2 g/L; zinc, a concentration of 2-5 g/L. As a smaller stream, the raffinate 13 had a higher concentration of both cobalt and zinc than previously observed. FIG. 15.

EXAMPLE 11

Figure 16:
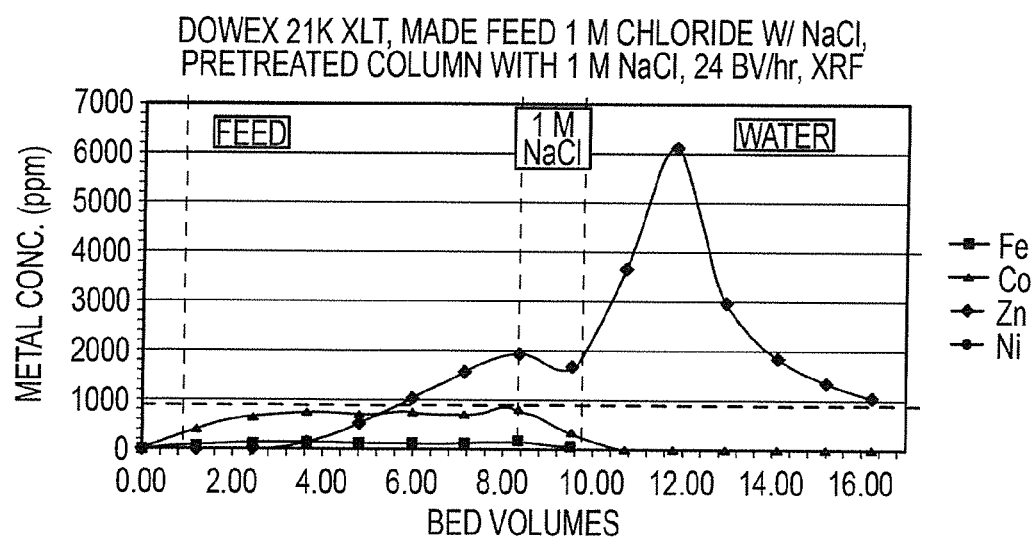
FIG. 16 is a graph showing loading and elution of metals from Example 11 according to an embodiment of the present invention.

The cobalt/zinc eluate (200 mL) from Example 10 was treated with 1 M NaCl and passed through 25 mL of a strong base anion exchange resin (e.g. DOWEX 21K XLT) to remove the anionic zinc. Due to the small amounts involved, zinc was removed, but in small quantities. It may be advantageous to use multiple and deeper beds of resin in a series to obtain complete zinc removal. See FIG. 16.

EXAMPLE 12

In Example 12, testing was done on raffinate from the Ray Mine. A variety of tests were performed.

First, raffinate 13 was tested for organic removal. Because raffinate 13 had a pH of 1.75 as shipped, and a pH of 3.0-3.5 after pH adjustment as described herein, organic removal testing was conducted at these two pH levels. Solids were present when pH was adjusted to 3.4. Testing was performed with and without the solids filtered out. An equilibrium isotherm test, or "bottle shake" test, was performed to determine if organics could be removed from pretreated raffinate. Adsorbent resin DOWEX OPIPORE L493 was used, along with hydroxypropylpicolylamine resin and bispicolylamine resin. The testing was performed at ambient temperature with 100 mL of raffinate and 1 mL of resin with overnight shaking. Testing for total organic carbon revealed that all three resins remove some total organic carbon from raffinate 13 with better removal at lower pH.

In a batch process using 400 gallon process tanks containing raffinate 13, raffinate underwent pH adjustment 104 by adding 3 g/L CaO; iron reduction 108, by adding 10 g/L $NaSO_3$; and solid removal 106, by adding 5 ppm coagulant (N8850). The solution was stirred overnight with a submersible circulation pump. Although the target pH was 3.0 to 3.5, the next day, the pH measured 2.7. The pH was adjusted with 1 g/L CaO and stirred for another day, achieving a final pH or 3.7. With the pump on, flocculant (N7871) was added, raffinate 13 was stirred, and then the pump was turned off to settle overnight. Raffinate 13 was then pumped off the top of the tank into a clean tote; the feed at the bottom of the tank with the solids was pumped into a separate tote. The pH level was adjusted further with 3.5 g/L CaO to within the desired range and measured 3.4.

Prior to copper removal, an inline cartridge filter was used to filter out any solids to minimize clogging of the resin beds. Copper removal was tested with two fixed beds of hydroxypropylpicolylamine resin. Each bed was 2 inches in diameter and about 4.5 feet deep with about 3 L of resin in each in a lead-lag configuration of columns. Raffinate was pumped into the top of a first column, out the bottom of the first column, and directly into the top of a second column from which it exited copper free. Sample ports were used to collect samples of raffinate coming out the bottom of each column. The lead (first) column 21 may then be regenerated with acid.

Breakthrough testing for copper removal using a freshly regenerated lag bed and a partially copper loaded lead bed; it showed that copper loaded well on the hydroxypropylpicolylamine resin using two passes. When the lead bed was nearly completely loaded with copper (100 BV), no copper could be detected breaking through the lag bed; however, a light blue color through the column indicated a small amount of copper breakthrough. See FIG. 17.

Regeneration of the lead bed with 20% $H_2SO_4$ was done in a direction countercurrent to copper loading with raffinate 13 at a flow rate of 8 BV/hr. See FIG. 17. Raffinate 13 was loaded in a down-flow direction and regeneration was performed in an up-flow direction so that the resin was almost completely regenerated when it was being fed with raffinate 13. Regeneration of the resin was performed at a slower rate than the copper loading with raffinate 13 to maximize copper concentration. The majority of the copper came off the resin in a single bed volume with a maximum concentration of 25 g/L. The copper loading capacity on the resin was determined to be about 12 g/L. This amount was lower than the total capacity of the resin and very selective for the copper over the other metals in the raffinate as shown in Table 1 below.

TABLE 2

|  | Cu | Fe | Ni | Co | Zn | Mn |
|---|---|---|---|---|---|---|
| Loading g/L | 11.99 | 0.18 | 0.14 | 0.01 | 0.07 | 0.25 |
| Loading Metal % | 94.86 | 1.42 | 1.11 | 0.08 | 0.55 | 1.98 |

Figure 18:
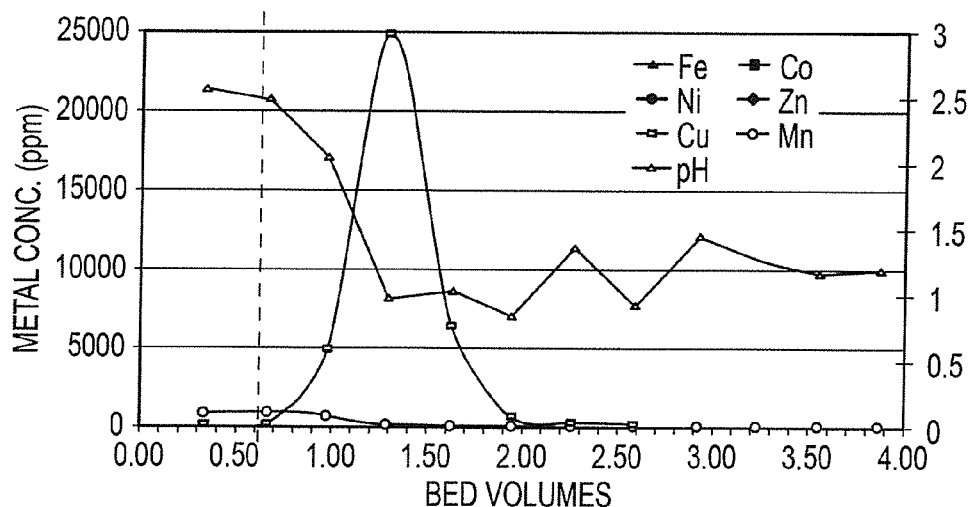
FIG. 18 is a graph showing copper elution in Example 12 according to an embodiment of the present invention.
Figure 19:
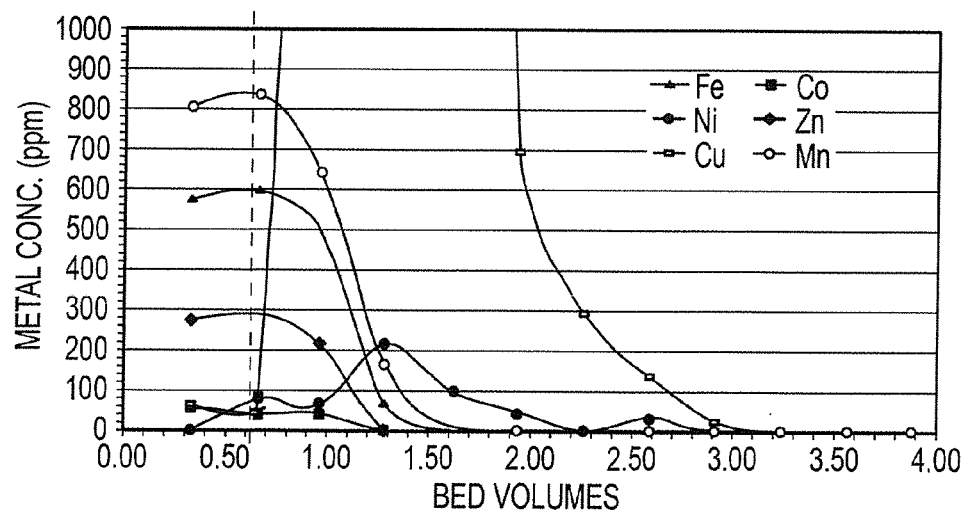
FIG. 19 is a graph showing copper elution in Example 12 according to an embodiment of the present invention.
Figure 20:
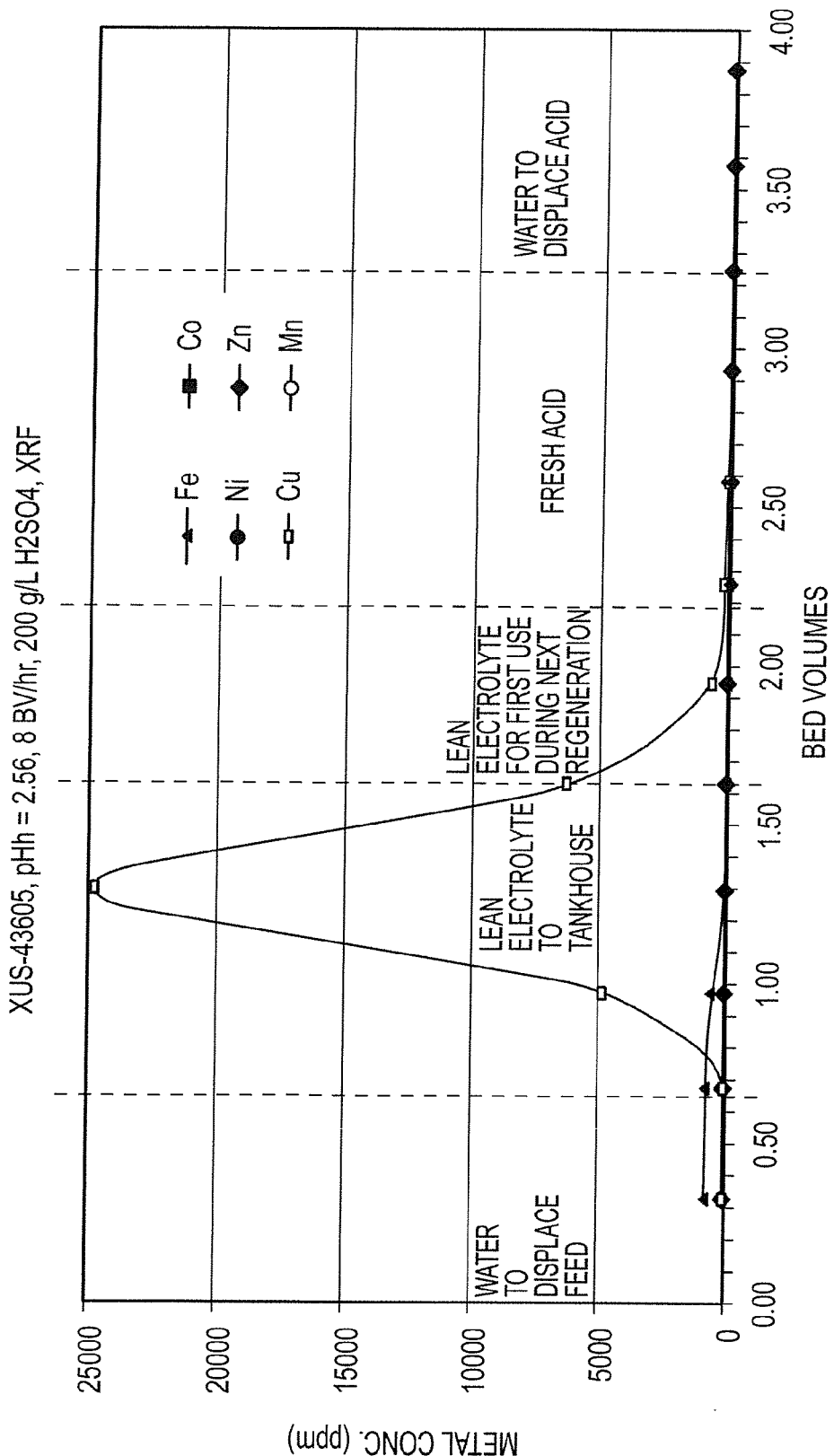
FIG. 20 is a graph showing copper elution in Example 12 according to an embodiment of the present invention.

The regeneration showed that 95% of the metal on the resin was copper. In other embodiments, there may be more optimization with feed displacement with water between the loading and the stripping with acid, such as water displacement with 1 BV/hr. There were no peaks noted for iron, cobalt, zinc or manganese; however, a small amount of nickel was stripped, as shown in FIG. 18-19.

In one embodiment, copper eluent may comprise lean electrolyte rather than clean acid. See, e.g., FIGS. 5, 19. Raffinate 13 in the column would need to be displaced with about 1 BV water back to starting point to keep undesirable metals from contaminating the copper. Copper would then be stripped from the column with lean electrolyte and transported to the EW tankhouse. Remaining lean electrolyte would strip a small amount of copper, which can be held until the next regeneration and used as the first amount of copper eluent. Fresh acid may be used to displace the lean electrolyte and water may be used to displace the acid before switching back to feed.

EXAMPLE 13

In Example 13, cobalt/zinc removal and nickel removal testing were done on raffinate 13 from the Ray Mine, using apparatus 10 as shown in FIGS. 2-4.

Raffinate 13 that was pretreated 105 with pH adjustment 104, iron reduction 108 and filtering, as well having substantially all copper removed 110, was subjected to cobalt removal processes using apparatus 10 previously described with reference to FIGS. 2-4. With specific reference to FIG. 2, pretreated raffinate 13, with copper removed, was conveyed from raffinate tank 12 (which, as shown, was a 400-gallon tank) to cobalt/nickel/zinc ion exchange unit 15, comprising a carousel equipped with 24 columns 151-159 loaded with bispicolylamine functionalized resin, such as that which has previously been described. The carousel was connected to a multiple port valve and was set on a timer so that the column index rotated regularly around the multiple port valve. Switchboards along the side of the cobalt/nickel/zinc ion exchange unit 15 (e.g., carousel) allowed access to the top and bottom of each column and allowed for the various solutions used during method 100 to be supplied to the particular groups of columns at the appropriate times. In one full rotation of the carousel, the bispicolylamine functionalized resin was subjected to loading with raffinate 13, rinsing, and eluting 113, 116. Raffinate 13 was pumped from the raffinate tank 12 through the first set of columns 151, each in a down-flow direction. The first set of columns 151 was arranged in parallel so that raffinate 13 entered each column at the top flowing through to the bottom. As shown in FIG. 2, the discharged raffinate 13 from each of the first set of columns 151 was collected and then pumped through the second set of five columns 152 arranged in a manner similar to the first set of five columns 151 so that the raffinate 13 entered each column at the top, flowing to the bottom of each column in a down-flow direction. As shown in FIGS. 2-4, the columns of the carousel moved in the first direction (e.g., in a direction from right to left as indicated by arrows 38); however, the raffinate 13 was fed into the first and second sets of columns 151, 152 in the second direction countercurrent to the direction of arrows 38 (e.g., left to right as shown in FIGS. 2-4). It is believed that feeding raffinate 13 in the second direction countercurrent to the first direction increased efficiency of the bispicolylamine functionalized resin with which the columns 151-159 were loaded.

Raffinate 13 discharged from the second set of columns 152 was collected and conveyed to barren tank 30. Some of the discharged raffinate 13 was collected in mass balance tank 34" so that its composition could be analyzed. Mass balance analyses from the several runs tested are listed below. In this test, it was determined that since cobalt concentration limits were near the detection limit of the x-ray fluorescence detector (XRF), loading was optimized on the more concentrated zinc. Timing of the test was based on the point at which the resin was fully loaded. For this test, the timing between indexes was 21 minutes.

Moving through the first and second sets of columns 151, 152, the bispicolylamine functionalized resin became more fully loaded with cobalt, nickel and zinc to the point of equilibrium between the ion exchange resin and raffinate 13, such that raffinate 13 was at full strength (e.g., cobalt, nickel and zinc have not been removed). Raffinate 13 at full strength therefore needed to be displaced back to the first set of columns 151. This was accomplished using two columns 153 connected in series, as shown in FIGS. 2-4. Cobalt/zinc eluate, which is this example comprised 2% $H_2SO_4$, as well as already stripped cobalt and zinc. The two columns 153 were connected to cobalt/zinc eluate tank 28 so that the two columns 153 received cobalt/zinc eluate in an up-flow direction from left to right countercurrent to the direction of arrows 38, which is the direction in which the ion exchange resin indexes, as shown in FIGS. 2-4. Cobalt/zinc eluate was chosen to use for displacement rather than water to avoid dilution so as to keep the cobalt concentration higher, because the cobalt/zinc are already in the cobalt/zinc eluate. Again, it is believed that the countercurrent relationship between the resin indexing and the cobalt/zinc eluate flow increased the efficiency of the process, reducing the amount of weak $H_2SO_4$ required.

The bispicolylamine functionalized resin was then stripped with cobalt/zinc eluent comprising weak $H_2SO_4$. Cobalt/zinc eluent was contained in cobalt/zinc eluent tank 27 that was fluidically connected to the four columns 154 connected in series so that the cobalt/zinc eluent entered the four columns 154 at the bottom and exited at the top, as shown in FIGS. 2-4. After stripping in the four columns 154, cobalt and zinc were co-eluted 113 in cobalt/zinc eluate which was conveyed from the last column of the four columns 154 to cobalt/zinc eluate tank 28. Mass balance tank 34″″ allowed for the cobalt/zinc eluate to be analyzed.

Next, to prepare the system for eluting 116 nickel, the cobalt/zinc eluent had to be displaced. Displacement was done with nickel eluate comprising 20% $H_2SO_4$ plus stripped nickel for the same reasons that cobalt/zinc eluate were used for displacement as explained above. Nickel eluate was supplied from nickel eluate tank 28 to two columns 155 connected in series, as shown in FIGS. 2-4.

Nickel was eluted 116 next using nickel eluent, which was a strong acid, 20% $H_2SO_4$. Nickel eluent, from nickel eluent tank 26, was supplied to three columns 156 connected in series so that the nickel eluent entered each column at the bottom and exited at the top as shown in FIG. 2. After stripping in the three columns 156, nickel was eluted 116 in nickel eluate which was conveyed from the last column of the three columns 156 to nickel eluate tank 29. Mass balance tank 34‴ allowed for the nickel eluate.

After the nickel was eluted 116, the nickel eluent in the three columns 157 was displaced using nickel eluent rinse water contained in nickel eluent rinse tank 36. Nickel eluent rinse tank 36 was connected to the three columns 156 arranged in series so that the nickel eluent rinse water entered each column at the bottom and exited at the top as shown in FIG. 2. The displaced nickel eluent was fed back into the elution circuit to minimize waste.

The system of Example 13 was run several times before collecting composition data. After that several mass balance runs were performed to analyze the composition of raffinate 13 entering the system, and raffinate, as well as cobalt/zinc eluate and nickel eluate, exiting at each point in the system. With additional testing, cobalt concentration in the cobalt/zinc eluate continued to increase, while nickel and iron concentrations were low. Nickel stripped with the cobalt appeared to be related to the acid strength of the cobalt/zinc eluent stripping acid strength, which seemed to be best balanced under the operating conditions tested where cobalt/zinc eluent comprised about 3.5% $H_2SO_4$.

Mass Balance 1

Upon start-up, cobalt/zinc eluate began traveling to the left on the switchboard. Therefore, the flow rate of the cobalt/zinc eluent was increased several times. The acid concentration of the cobalt/zinc eluent was also checked and increased. While the original concentration was 2.5%, this was increased to 3.85% by adding more acid. The increase in concentration provided better results. The iron loading was low; however, iron re-oxidization may have occurred due to a several-week interval between copper removal and this mass balance test. In an embodiment, low iron loading may be remedied by further lowering the pH of the raffinate 13 level to obtain better reducing action from $Na_2SO_3$.

Results

Mass Balance Tank 34″: Discharged raffinate/barren looked good (XRF data)
  Co=0 ppm
  Ni=0 ppm
  Zn=22 ppm
  Fe=497 ppm (raffinate was 506 ppm)
Mass Balance Tank 34″″: Co/Zn eluate was slightly contaminated
  Co=633 ppm
  Ni=396 ppm
  Zn=3378 μm
  Fe=531 ppm (raffinate was 506 ppm)
Mass Balance Tank 34‴: Ni eluate contained only Ni (352 ppm)
Overall metal loading on the resin was lower than expected
  Co=1.91 g/L
  Ni=1.72 g/L
  Zn=10.19 g/L
  Fe=1.60 g/L
  Total=15.42 g/L
  Expected ~20 g/L Mass Balance 2

Following the Mass Balance 1 test, changes were made to apparatus 10, as well as method 100. As shown in FIG. 4, nickel eluent rinse water tank 36 was removed. Instead, a pump was added so that displaced raffinate 13 from barren tank 30 could be used for displacement. As shown in FIG. 4, barren tank 30 was then connected to three columns 157 in series so that displaced raffinate 13 from barren tank 30 could be pumped into each column so that it entered at the bottom and exited at the top. After one pass, it appeared that the resin was not fully loaded by the time the resin exited the loading zone in the first and second set of columns 151, 152. Therefore, three passes were used before moving the columns to try to get the loading higher.

Results

Mass Balance Tank 34″: Discharged raffinate/barren contained more Zn after running loading zone without indexing (XRF data)
  Co=0 ppm
  Ni=0 ppm
  Zn=78 ppm
  Fe=544 ppm
Mass Balance Tank 34″″: Co/Zn eluate was cleaner
  Co=703 ppm
  Ni=353 ppm
  Zn=2827 ppm
  Fe=350 ppm
Mass Balance Tank 34‴: Ni Eluate contained Ni and Fe
  Ni=352 ppm
  Fe=31 ppm
Overall metal loading on the resin was lower than Mass Balance 1, but cobalt loading was slightly higher
  Co=2.03 g/L
  Ni=1.47 g/L
  Zn=8.16 g/L Fe=1.05 g/L
Total=12.71 g/L Mass Balance 3

Following Mass Balance 2, two changes were made to apparatus 10 and method 100 for Mass Balance 3. Because nickel concentration in the nickel eluate was low with a lot of 20% $H_2SO_4$ containing a few ppm of nickel, nickel elution 116 was converted to a re-circulation system to allow nickel concentration to build up over time. When nickel concentration reaches a high level, the entire nickel eluent/eluate could be replaced with fresh acid, or some nickel eluent/eluate could be removed and replenished with fresh acid to allow nickel to continue to be stripped. Thus, as shown in FIG. 3, nickel eluent tank 26 and nickel eluate tank 29 were removed. In the spot previously occupied by nickel eluate tank 29, nickel eluent/eluate tank 32 was inserted to hold both the nickel eluent and the nickel eluate which were recycled. However, nickel eluent/eluate tank 32 was connected to four columns 159 as shown in FIG. 3. Another change was made, this time to the loading section. From previous tests, it appeared that metal was getting through the loading section as evidenced by high zinc which may be correlated with the presence of cobalt. As shown in FIG. 3, two columns 158 were added to accommodate the discharged raffinate 13 from the second set of columns 152. The entire flow of discharged raffinate 13 was fed through the two columns in parallel as shown in FIG. 3. The result was not only to collect trace metal left in the discharged raffinate 13, but also to displace any nickel eluent/eluate left in the column. The same pump added in FIG. 4 to pull discharged raffinate 13 from barren tank 30 for rinsing was also used to balance the re-circulated regeneration of the nickel, as well as weak acid displacement from the cobalt/zinc co-eluting 113 process.

Results

Mass Balance Tank 34": Discharged raffinate/barren contained more Zn after running loading zone without indexing (XRF data)
Co=0 ppm
Ni=0 ppm
Zn=107 ppm
Fe=652 ppm Mass Balance Tank 34"": Co/Zn Eluate had higher Co
Co=898 ppm
Ni=530 ppm
Zn=3622 ppm
Fe=362 ppm Mass Balance Tank 34"': Ni eluate contained Ni and Fe
Ni=468 ppm
Fe=120 ppm Overall metal loading on the resin was lower, but mostly due to less Fe and Zn
Co=1.76 g/L
Ni=1.16 g/L
Zn=7.10 g/L
Fe=0.69 g/L
Total=10.72 g/L Mass Balance 4

Mass balance 4 was conducted using apparatus 10 as shown in FIG. 3. In previous tests, more iron appeared in the cobalt eluate than expected. It was believed that iron may have resulted from failure to displace all raffinate 13 in the column. Since manganese does not load on the resin and was present in fairly high concentration in raffinate 13, it was believed that manganese would be a good marker for raffinate 13 in the cobalt eluate. To control this, the pumps for the cobalt elution 114 and raffinate 13 recovery were better balanced. The raffinate recovery pump was turned up to ensure no raffinate 13 made it into the cobalt eluate. No raffinate 13 showed up in the cobalt eluate since manganese and iron concentrations were 0 ppm. Since nickel appeared in the cobalt eluate, the cobalt/zinc eluent was slightly diluted in an attempt to strip less nickel at this step. The cobalt/zinc eluent acid concentration was dropped from 3.85% to 3.37% $H_2SO_4$.

Results

Mass Balance Tank 34": Discharged raffinate/barren (XRF data)
Co=0 ppm
Ni=0 ppm
Zn=96 ppm
Fe=628 ppm
Mn=836 ppm (838 ppm in the feed)

Mass Balance Tank 34"": Co/Zn eluate had much higher Co and no entrained raffinate
Co=1616 ppm
Ni=524 ppm
Zn=6640 ppm
Fe=0 ppm
Mn=0 ppm Mass Balance Tank 34"': Ni eluate continued to increase in concentration; Fe is near the detection limit
Ni=932 ppm
Fe=0 ppm Overall metal loading on the resin was similar
Co=1.99 g/L
Ni=0.93 g/L
Zn=8.17 g/L
Fe=0 g/L
Total=11.09 g/L Mass Balance 5

In mass balance 5, cobalt concentration continued to increase in the cobalt eluate, and the nickel concentration was lower which may have been due to the lower acid concentration of the cobalt/zinc eluent. Iron did load on the resin although there was no raffinate entrained as shown by lack of manganese in the cobalt eluate. Likely, this may have resulted from reoxidization of the iron during intervals between tests.

Results

Mass Balance Tank 34": Discharged raffinate/barren (XRF data unless noted)
Co=6.42 ppm (Raffinate Co=47.57; both numbers by AA)
Ni=0 ppm
Zn=163 ppm
Fe=596 ppm
Mn=853 ppm Mass Balance Tank 34"": Co/Zn eluate had higher Co, but some Fe
Co=2076 ppm
Ni=216 ppm
Zn=7373 ppm
Fe=552 ppm
Mn=0 ppm Mass Balance Tank 34"': Ni Eluate continued to increase in concentration; Fe is near the detection limit
Ni=1144 ppm
Fe=38 ppm Overall metal loading on the resin was lower
Co=1.85 g/L
Ni=0.23 g/L
Zn=6.53 g/L
Fe=0.52 g/L
Total=9.12 g/L While only selected embodiments have been chosen to illustrate the present invention, it will be apparent to those of ordinary skill in the art from this disclosure that various changes and modifications can be made herein without departing from the scope of the invention as defined in the appended claims. For example, the size, shape, location or orientation of the various components disclosed herein can be changed as needed or desired. Components that are directly connected may have intermediate structures between them. The functions of two or more elements or units may be performed by one and vice versa. The structures, steps, and functions of one embodiment may be adopted in another embodiment. It is not necessary for all advantages to be present in a particular embodiment at the same time. In addition, terms of degree such as "substantially," "about," and "approximate" as used herein mean a reasonable amount of deviation of the modified term such that the result would not be changed. For example, these terms can be construed as including a deviation of at least ±5% of the modified term if this deviation would not negate the meaning of the term it modifies. Thus, it is contemplated that the inventive concepts herein described may be variously otherwise embodied and it is intended that the appended claims be construed to include alternative embodiments of the invention, except insofar as limited by the prior art.

What is claimed is:

1. A method for extracting cobalt from raffinate, comprising:
    producing raffinate from copper solvent extraction, the raffinate comprising at least cobalt, copper, ferric iron and nickel;
    producing pretreated raffinate by pretreating the raffinate in a manner that will allow substantially all copper to be removed from the pretreated raffinate;
    removing substantially all copper from the pretreated raffinate with a first ion exchange resin selective for copper to bind the first ion exchange resin to the copper to produce cobalt and nickel containing raffinate;
    absorbing cobalt and nickel from the cobalt and nickel containing raffinate using a second ion exchange resin selective for both cobalt and nickel, the second ion exchange resin binding to both cobalt and nickel; and
    eluting cobalt first and then nickel from the second ion exchange resin.

2. The method of claim 1, wherein the producing pretreated raffinate comprises raising pH level of the raffinate, removing solids from the raffinate, and reducing ferric iron in the raffinate to ferrous iron.

3. The method of claim 2, wherein the reducing ferric iron to ferrous iron comprises adding sodium sulfite to the raffinate.

4. The method of claim 2, wherein raising the pH level comprises raising the pH level to between about 3.0 and about 3.7.

5. The method of claim 1, wherein the first ion exchange resin is a hydroxypropylpicolylamine.

6. The method of claim 1, wherein:
    eluting cobalt first and then nickel comprises using a first solution of strong acid to separate cobalt from the second ion exchange resin and a second solution of strong acid to separate nickel from the second ion exchange resin, the second solution being stronger than the first solution.

7. The method of claim 6, wherein the second solution being stronger than the first solution comprises the second solution being about 10 times stronger than the first solution.

8. The method of claim 1, wherein removing substantially all copper from the pretreated raffinate comprises removing about 100 percent of copper from the pretreated raffinate.

9. A method for recovering cobalt from raffinate;
    providing a supply of raffinate from copper solvent extraction, the raffinate comprising at least cobalt, copper, ferric or ferrous iron, nickel and zinc;
    producing modified raffinate by raising pH level of the raffinate to between about 3 and about 3.5 and reducing any ferric iron to ferrous iron;
    removing substantially all copper from the modified raffinate by using an oxime reagent to bind the copper, producing copper extracted raffinate;
    removing cobalt, zinc and nickel from the copper extracted raffinate using an ion exchange resin selective for cobalt, zinc and nickel, the ion exchange resin attaching to the cobalt, zinc and nickel;
    separating the nickel from the ion exchange resin using a first aqueous solution of a first strong acid; and
    separating the cobalt and zinc from the ion exchange resin using a second aqueous solution of a second strong acid, the second aqueous solution being stronger than the first aqueous solution, the cobalt and zinc being removed together in the second aqueous solution.

10. The method of claim 9, wherein the oxime reagent is aldoxime.

11. The method of claim 9, further comprising:
    ensuring that pH of the second aqueous solution containing cobalt and zinc is between about 2 and about 3.5;
    adding an acidic solvent extraction reagent to the second aqueous solution containing cobalt and zinc; and
    separating the zinc from the second aqueous solution containing cobalt and zinc by adding a third strong acid to the second aqueous solution after the adding of the acidic solvent extraction reagent.

12. The method of claim 11, wherein the third strong acid is at a concentration of about 30 to about 60 grams per liter.

13. The method of claim 11, wherein the first strong acid, the second strong acid and the third strong acid are the same substance.

14. The method of claim 9, wherein the first strong acid and the second strong acid are the same substance.

15. The method of claim 11, wherein the acidic solvent extraction reagent is a phosphinic acid or a phosphoric acid.

16. The method of claim 9, wherein the concentration of the oxime reagent is about 10% by volume.

17. The method of claim 9, further comprising stripping the copper bound to the oxime reagent using copper eluent having a concentration of about 150 grams per liter to about 200 grams per liter.

18. The method of claim 12, further comprising increasing the concentration of the third strong acid from about 60 grams per liter to about 180 grams per liter to elute iron from the second aqueous solution.

19. A method of ion exchange cobalt recovery from raffinate, comprising:
    producing raffinate including at least cobalt, zinc, copper, nickel and iron;
    pretreating the raffinate to produce pretreated raffinate by at least:
        raising pH of the raffinate;
        removing any solids from the raffinate; and
        reducing any ferric iron in the raffinate to ferrous iron;
    removing substantially all the copper from the pretreated raffinate to produce substantially copper-free raffinate by at least:

loading a copper recovery ion exchange unit with a first ion exchange resin selective for copper;

feeding the pretreated raffinate into the copper recovery ion exchange unit in a first direction; and regenerating the copper recovery ion exchange unit to recover substantially all the copper from the ion exchange resin selective for copper;

loading a cobalt, nickel, zinc recovery ion exchange unit with a second ion exchange resin selective at least for cobalt;

feeding the substantially copper-free raffinate into the cobalt, nickel, zinc recovery ion exchange unit in the first direction, the second ion exchange resin holding cobalt, zinc and nickel;

displacing the substantially copper-free raffinate from the cobalt, nickel, zinc recovery ion exchange unit;

feeding cobalt, zinc eluent into the cobalt, nickel, zinc recovery ion exchange unit to elute the cobalt and zinc in a cobalt, zinc solution;

displacing the cobalt, zinc eluent in the cobalt, nickel, zinc recovery ion exchange unit; and feeding nickel eluent into the cobalt, nickel, zinc recovery ion exchange unit to elute the nickel.

20. The method of claim 19, wherein the regenerating comprises feeding a strong acid into the copper recovery ion exchange unit in a second direction, the second direction being countercurrent to the first direction.

21. The method of claim 19, wherein the feeding the pretreated raffinate into the copper recovery ion exchange unit comprises feeding at a first rate and wherein the regenerating comprises regenerating at a second rate, the second rate being slower than the first rate.

22. The method of claim 19, wherein the first ion exchange resin selective for copper is a hydroxypropylpicolylamine resin.

23. The method of claim 19, further comprising displacing the nickel eluent.

24. The method of claim 23, wherein the displacing the nickel eluent comprises displacing with nickel eluent or displacing with recycled nickel eluent and nickel eluate.

25. The method of claim 19, wherein the second ion exchange resin is a bispicolylamine functionalized resin.

26. The method of claim 19, wherein the feeding cobalt, zinc eluent comprises feeding cobalt, zinc eluent in a second direction, the second direction being countercurrent to the first direction.

27. The method of claim 19, further comprising separating the zinc from the cobalt in the cobalt, zinc solution.

28. The method of claim 27, wherein the separating comprises using a basic anion exchange resin to remove anionic zinc.

29. The method of claim 19, wherein the raising the pH of the raffinate comprises raising the pH to between about 3.0 and about 3.5.

30. The method of claim 19, wherein the removing solids from the raffinate comprises filtering the raffinate.

31. The method of claim 19, wherein the raising the pH of the raffinate comprises adding calcium oxide or calcium carbonate to the raffinate.

32. The method of claim 19, wherein the reducing any ferric iron comprises adding sodium sulfite to the raffinate.

33. The method of claim 19, wherein the step of feeding cobalt, zinc eluent into the cobalt, nickel, zinc recovery ion exchange unit and the step of displacing the cobalt, zinc eluent occur prior to the step of feeding nickel eluent into the cobalt, nickel, zinc recovery ion exchange unit.

34. The method of claim 19, wherein the regenerating comprises feeding lean electrolyte into the copper recovery ion exchange unit.

35. A method for recovering cobalt from raffinate, comprising:

producing the raffinate from copper solvent extraction;

analyzing the raffinate to determine that it contains at least cobalt, copper, iron, zinc and nickel;

pretreating the raffinate to produce pretreated raffinate by at least:
achieving a pH for the raffinate of between about 3.0 to about 3.7;
removing any solids from the raffinate; and
eliminating any ferric iron from the raffinate;

producing substantially copper-free raffinate from pretreated raffinate by at least:
removing substantially all of the copper from the pretreated raffinate using a high-copper affinity ion exchange resin; and
stripping copper from the high-copper affinity ion exchange resin with copper eluent, the stripped copper being in solution; and
removing the cobalt, zinc and nickel from the substantially copper-free raffinate by at least:
absorbing cobalt, zinc and nickel using a second ion exchange resin selective to cobalt, zinc and nickel;
prior to stripping nickel, stripping cobalt and zinc together from the second ion exchange resin, producing a cobalt, zinc solution; and
stripping nickel from the second ion exchange resin.

36. The method of claim 35, further comprising subjecting the stripped copper in solution to electrowinning to recover copper.

37. The method of claim 35, further comprising removing zinc from the cobalt, zinc solution with a resin selective for zinc over cobalt.

* * * * *